(12) United States Patent
Yoshino et al.

(10) Patent No.: US 10,733,317 B2
(45) Date of Patent: Aug. 4, 2020

(54) SEARCHABLE ENCRYPTION PROCESSING SYSTEM

(71) Applicant: Hitachi, Ltd., Tokyo (JP)

(72) Inventors: Masayuki Yoshino, Tokyo (JP); Hisayoshi Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 167 days.

(21) Appl. No.: 15/746,872

(22) PCT Filed: Aug. 19, 2016

(86) PCT No.: PCT/JP2016/074170
§ 371 (c)(1),
(2) Date: Jan. 23, 2018

(87) PCT Pub. No.: WO2017/033843
PCT Pub. Date: Mar. 2, 2017

(65) Prior Publication Data
US 2019/0130125 A1    May 2, 2019

(30) Foreign Application Priority Data
Aug. 25, 2015  (JP) .................. 2015-165619

(51) Int. Cl.
*G06F 21/00* (2013.01)
*G06F 21/62* (2013.01)
*H04L 9/00* (2006.01)
*H04L 9/08* (2006.01)
*G06F 16/907* (2019.01)
(Continued)

(52) U.S. Cl.
CPC ........ *G06F 21/6227* (2013.01); *G06F 16/907* (2019.01); *G06F 16/953* (2019.01); *H04L 9/008* (2013.01); *H04L 9/06* (2013.01); *H04L 9/0662* (2013.01); *H04L 9/0869* (2013.01); *H04L 9/0891* (2013.01); *G06F 2221/2107* (2013.01)

(58) Field of Classification Search
CPC .......................... G06F 21/6227; G06F 16/907
USPC ......................................................... 713/164
See application file for complete search history.

(56) References Cited

U.S. PATENT DOCUMENTS

2011/0035602 A1* 2/2011 Meng .................... H04L 9/0662
713/193
2013/0046974 A1  2/2013 Kamara et al.

FOREIGN PATENT DOCUMENTS

JP  2015-177506 A   10/2015
WO 2012/077541 A1  6/2012

OTHER PUBLICATIONS

Yoshinori Aono et al., "Security Updatable Jun Dokei Ango o Mochiita Hitoku Data no Senkei Kaiki Enzan", 2015 Nen Symposium on Cryptography and Information Security Koen Ronbunshu, 2015, p. 1 to 8. (cited in International Search Report).

(Continued)

*Primary Examiner* — Anthony D Brown
(74) *Attorney, Agent, or Firm* — Mattingly & Malur, PC

(57) ABSTRACT

In this searchable encryption processing system in which a registered client and a management server are connected via a network, the registered client is provided with a registered client processing unit that generates, on the basis of the difference between a first secret key for encrypting plaintext data and a second secret key for newly encrypting the plaintext data, a difference key mask for updating, by using the second secret key, confidential data encrypted by the first secret key.

7 Claims, 16 Drawing Sheets

(51) Int. Cl.
*H04L 9/06* (2006.01)
*G06F 16/953* (2019.01)

(56) References Cited

OTHER PUBLICATIONS

Yoshinori Aono et al., "Fast and Secure Linear Regression and Biometric Authentication with Security Update", Cryptology ePrint Archive: Report 2015/692.
International Search Report of PCT/JP2016/074170 dated Oct. 11, 2016.
Translation of Japanese Office Action received in corresponding Japanese Application No. 2015-165619 dated Sep. 10, 2019.

* cited by examiner (DECRYPTION)

(DIFFERENCE KEY MASK GENERATION)

(REENCRYPTION)

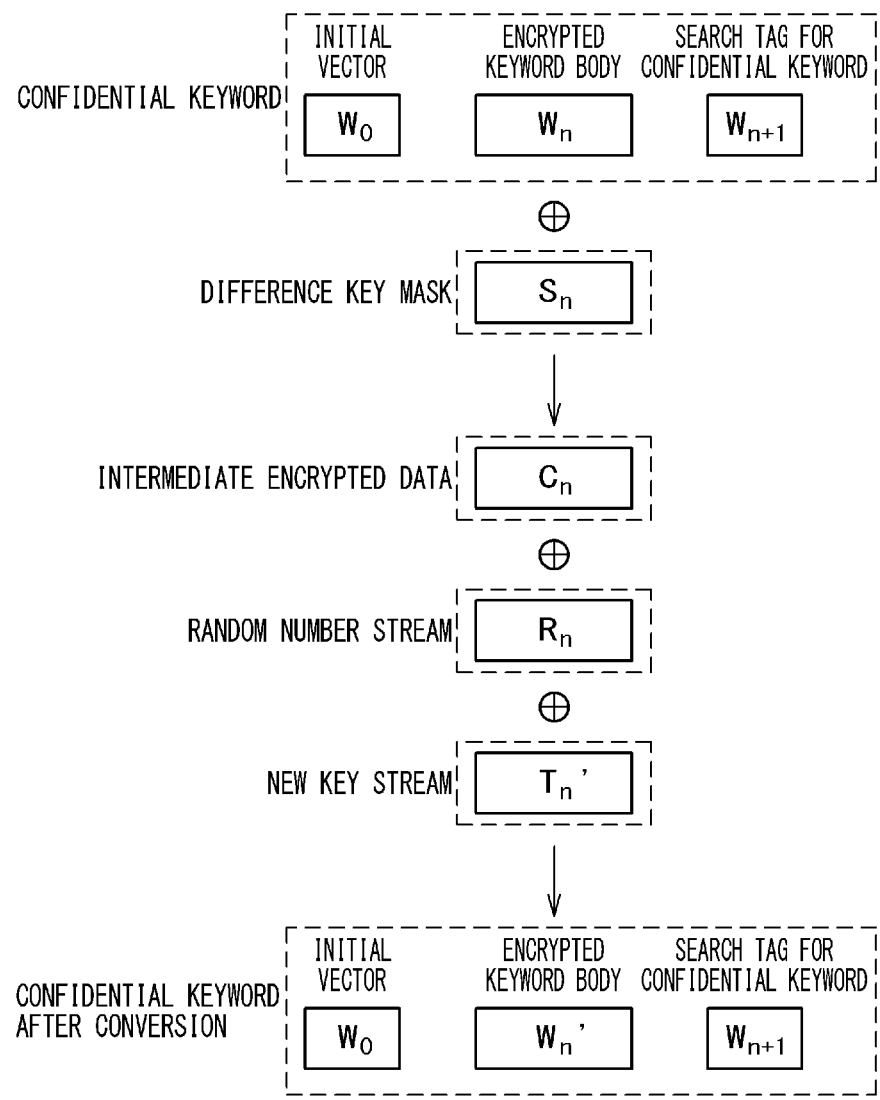

SEARCHABLE ENCRYPTION PROCESSING SYSTEM

TECHNICAL FIELD

The present invention relates to a searchable encryption processing system.

BACKGROUND ART

Recently, to reduce costs for the development and the operation management of an information system, an operation management type called a cloud not for maintaining the information system by itself but for utilizing an information system provided by another organization attracts lots of attention. In the meantime, as an organization that manages an information system is different from an organization that utilizes an information system in a cloud, it is difficult to take measures to prevent an information leak and others, cause investigation after an accident occurs, measures to prevent reoccurrence and others by only the management organization of the information system. Therefore, for measures to prevent an unauthorized leak of data, is required to utilize cryptography and to secure confidentiality of data beforehand.

In a server/client model, for technology to prevent information of deposited data from being leaked from a server while a client deposits the data in the server, a method of utilizing cryptography is known. For example, in Patent Literature 1, a searching method of searching for deposited encrypted data without decrypting the encrypted data according to a request from a client is disclosed. This searching method adopts a stochastic encryption method which is securer than a decisive encryption method having one-to-one simple correspondence between plain text and a cryptograph and in which plain text and a cryptograph have one-to-m intricate correspondence. In Patent Literature 1, technique for securely searching for data deposited in a server, preventing an information leak to a server manager is disclosed.

CITATION LIST

Patent Literature

PTL 1: WO 2012/077541

SUMMARY OF INVENTION

Technical Problem

However, according to the technique disclosed in Patent Literature 1, it is not easy to update a secret key. Referring to FIG. 2, the above-mentioned will be described below. When a state shown on the upside of FIG. 2 in which plural users who share a secret key can search a cryptograph in a management server is to be changed to a state shown on the downside of FIG. 2 in which only certain users can search a cryptograph in the management server, it is required to invalidate the old secret key shared by all the users and to validate only a new secret key held by only specific users. In that case, a cryptograph stored in the management server and encrypted by the old secret key is required to be changed to a cryptograph encrypted by the new secret key.

However, as the cryptograph held in the management server cannot be directly changed by a searchable encryption, the user is required to pass the secret key to the management server. However, when the secret key is passed to the management server, plaintext information is exposed and confidentiality of encrypted data cannot be kept. Therefore, to change a cryptograph without decryption, after a user once downloads all encrypted data in the management server, decrypts all the encrypted data and encrypts them by the new secret key again, the user is required to upload them to the management server again. As in this flow, a calculation amount in decryption and encryption is proportional to quantity of encrypted data deposited in the server, this flow has a defect that a load on the user's side is large.

The present invention is made in view of the above-mentioned and its object is to provide a searchable encryption processing system that enables converting encrypted data corresponding to a certain secret key to encrypted data corresponding to another secret key without placing a load onto the side of a user in a server/client model, maintaining confidentiality of the encrypted data.

Solution to Problem

To settle the above-mentioned problem and to achieve the object, the searchable encryption processing system according to the present invention is based upon a searchable encryption processing system in which a registered client and a management server are connected via a network and is configured as a searchable encryption processing system having a characteristic that the registered client is provided with a registered client processing unit that generates a difference key mask for updating confidential data encrypted by a first secret key by a second secret key on the basis of difference between the first secret key for encrypting plaintext data and the second secret key for newly encrypting the plaintext data.

Advantageous Effects of Invention

According to the present invention, in the server/client model, encrypted data corresponding to a certain secret key can be converted to encrypted data corresponding to another secret key, maintaining confidentiality of the encrypted data without placing a load onto the side of a user.

BRIEF DESCRIPTION OF DRAWINGS

FIG. 16 is a block diagram showing a confidential keyword conversion procedure in the management server.

DESCRIPTION OF EMBODIMENTS

Figure 1:
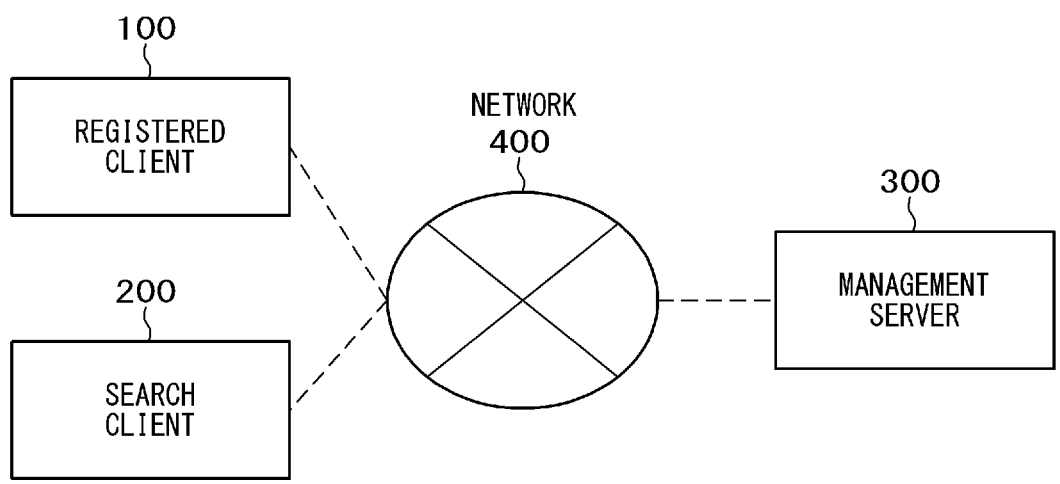
FIG. 1 is a schematic diagram showing a system equivalent to a first embodiment.
Figure 2:
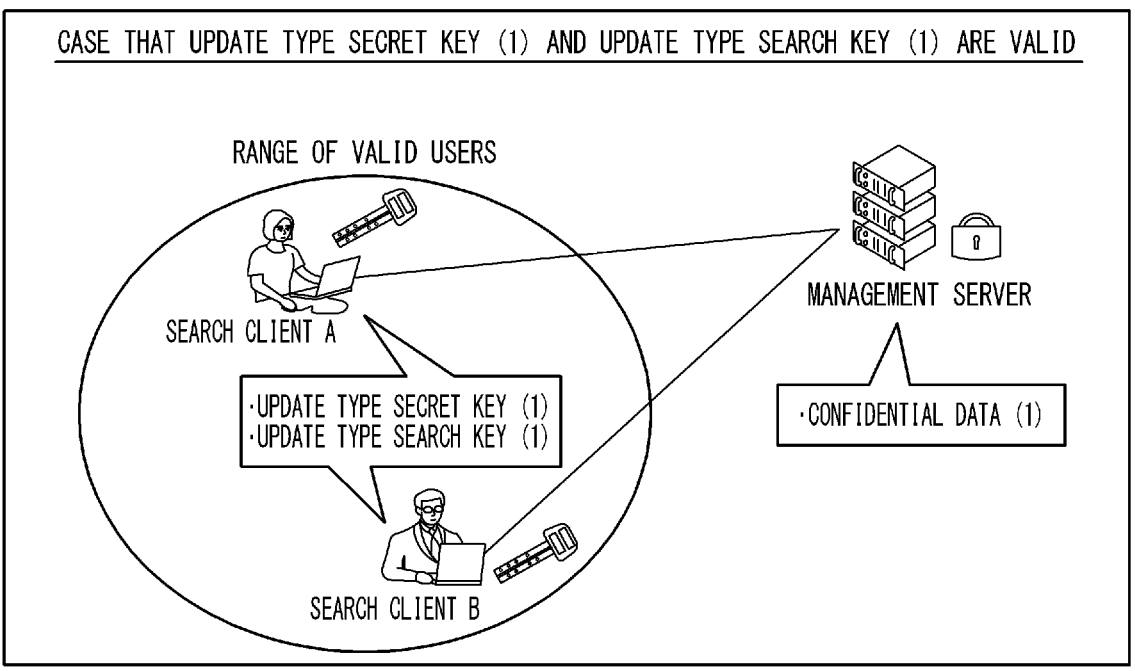
FIG. 2 shows a range of users who can search a cryptograph from a management server.
Figure 2:
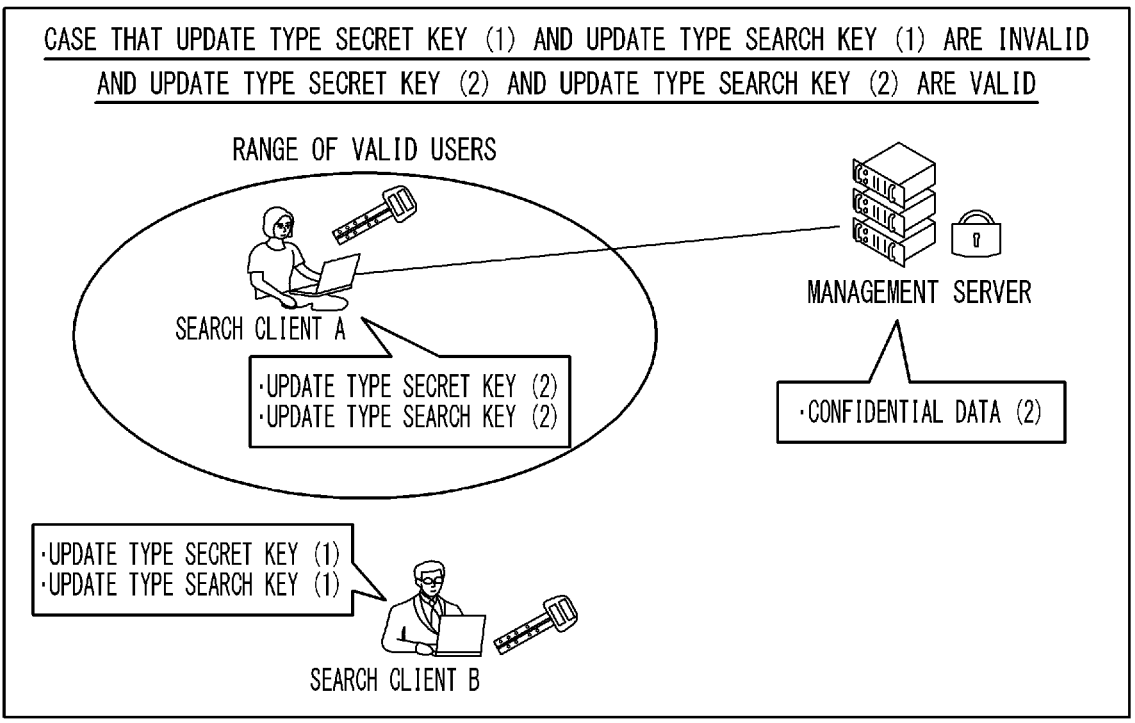

Embodiments of the present invention will be detailedly described referring to the drawings below. In the embodiments, the same reference numeral is allocated to the same member in principle and repeated description is omitted.

First Embodiment

A first Embodiment discloses that in a system in which a registered client 100, a search client 200 and a management server 300 are connected via a network 400, the registered client 100 registers prepared confidential data with the management server 300, the search client 200 requests the management server 300 to search for the confidential data and the confidential data acquired from the management server 300 can be decrypted. Besides, The first embodiment discloses that the registered client 100 independently generates a key stream on the basis of two types of secret keys of a new secret key and an old secret key respectively held by the registered client 100 by using the respective secret keys for a process for updating the secret key held by the registered client and the management server 300 can update to confidential data corresponding to the new secret key by a difference key mask which is difference between these two types of key streams.

FIG. 1 is a schematic diagram showing a searching system in this embodiment to which a searchable encryption processing system according to the present invention is applied. As shown in FIG. 1, the searching system is provided with the registered client 100, the search client 200 and the management server 300 and is configured so that each can transmit/receive information via the network 400.

In this case, the registered client 100 in this embodiment functions as a transmitter-receiver for registering data that transmits confidential data to the management server 300. The search client 200 functions as a transmitter-receiver for a search that transmits a confidential keyword to the management server 300 and receives a search result. The management server 300 functions as a transmitter-receiver that stores the confidential data in a database 341 and searches the database 341 for data.

Besides, the registered client 100 in this embodiment functions as a transmitter-receiver for requesting to covert confidential data managed in the management server 300 and corresponding to a certain secret key to confidential data corresponding to another secret key.

Figure 3:
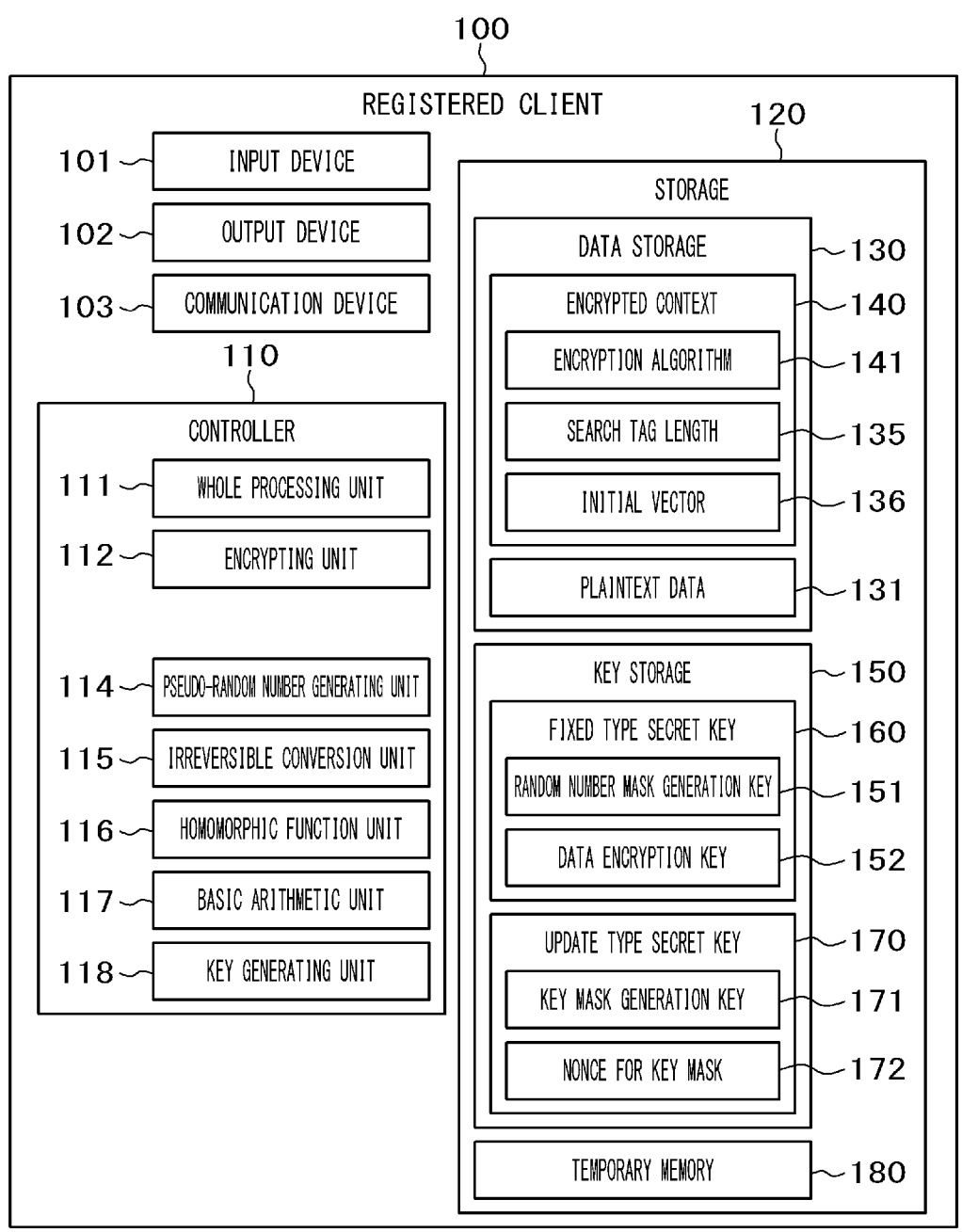
FIG. 3 is a schematic diagram showing functions of a registered client.

FIG. 3 is a functional schematic diagram showing the registered client 100. As shown in FIG. 3, the registered client 100 is provided with a controller 110, a storage 120, an input device 101, an output device 102 and a communication device 103.

The storage 120 is provided with a data storage 130, a key storage 150 and a temporary memory 180.

The data storage 130 stores information for specifying a transmit statement which is data to be transmitted to the management server 300. Besides, the data storage 130 stores information for specifying plaintext data 131 accepted via the input device 101. Moreover, the data storage 130 stores an encryption context 140 acquired by putting information related to encryption together. In the encryption context 140, encryption algorithm 141 used in preparing confidential data, an initial vector 136 and search tag length 135 are stored. When data upon which confidential data is prepared is fixed to be 128 bits or less, the initial vector 136 may be also unused. In that case, the initial vector is not required to be stored and in all processing in the registered client 100, processing related to the initial vector is omitted.

The key storage 150 stores information for specifying a fixed type secret key 160 and an updated type secret key 170 which are respectively to be secretly managed by the registered client 100 from a viewpoint of security. The fixed type secret key 160 is a secret key continued to be also continuously utilized after a confidential data updation process disclosed in this embodiment and in a field of the fixed type secret key, information for specifying a random number mask generation key 151 and a data encryption key 152 is stored. The update type secret key 170 is a secret key in which utilized secret keys vary before and after the confidential data updation process disclosed in this embodiment and in a field of the update type secret key 170, information for specifying a key mask generation key 171 and a nonce for a key mask 172 is stored. The update type secret key 170 includes a first secret key for encrypting plaintext data by the conventional type old secret key and a second secret key for encrypting the plaintext data by the new secret key. Besides, the update type secret key includes a first key mask generation key for generating the first secret key, a first nonce for a key mask, a second key mask generation key for generating the second secret key and a second nonce for a key mask.

The temporary memory 180 stores information required in processing in the controller 110.

The controller 110 is provided with a whole processing unit 111, an encryption unit 112, a pseudo-random number generating unit 114, an irreversible conversion unit 115, a homomorphic function unit 116, a basic arithmetic unit 117 and a key generating unit 118. However, when no secret key generation process is performed, the key generating unit 118 is not necessarily required to be held.

The whole processing unit 111 controls the whole processing in the registered client 110. For example, the whole processing unit 111 stores information the input of which is accepted via the input device 101 in the data storage 130 as plaintext data 131.

Besides, the whole processing unit 111 displays the plaintext data 131 on the output device 102.

Moreover, the whole processing unit 111 reads the plaintext data 131 stored in the data storage 130, inputs the read plaintext data to the encrypting unit 112, the pseudo-random number generating unit 114, the irreversible conversion unit 115, the homomorphic function unit 116 and the basic arithmetic unit 117, and stores respective output data in the data storage 130 as confidential data.

In addition, the whole processing unit 111 transmits the confidential data to the management server 300 via the communication device 103.

Further, the whole processing unit 111 stores confidential data received from the management server 300 via the communication device 103 in the temporary memory 180 and displays the confidential data on the output device 102.

The encrypting unit 112 outputs data acquired by encrypting the input data.

For example, plaintext data 131 and a data encryption key 152 are input from the whole processing unit 111 and the encrypting unit outputs encrypted data. For example, the encrypting unit 112 is realized by installing standard encryption algorithm.

The pseudo-random number generating unit 114 outputs a pseudo-random number. For example, the pseudo-random number generating unit 114 is realized by installing standard pseudo-random number generation algorithm requiring a secret key and an initial vector. Besides, for example, the pseudo-random number generating unit 114 is realized by hardware that outputs a random number on the basis of physical phenomena such as temperature, time and electric energy. In this embodiment, the pseudo-random number generating unit 114 outputs a pseudo-random number using the random number mask generation key 151 and the initial vector 136 respectively input from the whole processing unit 111.

The irreversible conversion unit 115 outputs data acquired by compressing input data.

For example, the irreversible conversion unit 115 converts data input from the whole processing unit 111 to another fixed length data and outputs it.

For example, as for the irreversible conversion unit 115, the irreversible conversion unit 115 that converts arbitrary length input data to 256-bit data can be realized by installing SHA-256 which is standard cryptographic hash function algorithm.

The homomorphic function unit 116 outputs an output result of a function having homomorphism based upon input data as data.

However, the function having homomorphism (hereinafter, called the homomorphic function) denote a function that meets the following mathematical expression 1 for a function F, an input variable x and an input variable y.

$$F(x \cdot y) = F(x) ? F(y) \qquad \text{(Mathematical expression 1)}$$

However, "·" and "?" denote symbols of operation, and a symbol of operation for addition +, a symbol of operation for multiplication *, a symbol of operation xor for operating exclusive-OR (XOR) which is exclusive-OR every bit and others can be put.

At this time, when the symbol xor for operating XOR is put for · and ? in the mathematical expression 1, a mathematical expression 2 holds true.

$$F(x \text{ xor } y) = F(x) \text{ xor } F(y) \qquad \text{(Mathematical expression 2)}$$

The basic arithmetic unit 117 executes processing related to basic arithmetic operation such as addition, subtraction, comparison operation, AND, OR and XOR.

For example, the basic arithmetic unit 117 outputs exclusive-OR operation which is exclusive-OR every bit of two data input from the whole processing unit 111 and a verification result of whether an equal sign holds good in comparison operation or not as data.

The key generating unit 118 is used in processing for generating a fixed type secret key and an update type secret key respectively used for encryption algorithm and generation of a random number. For example, the key generating unit 118 is realized by installing standard key generation algorithm. Besides, the fixed type secret key and the update type secret key may be also generated using the pseudo-random number generating unit 114.

Figure 6:
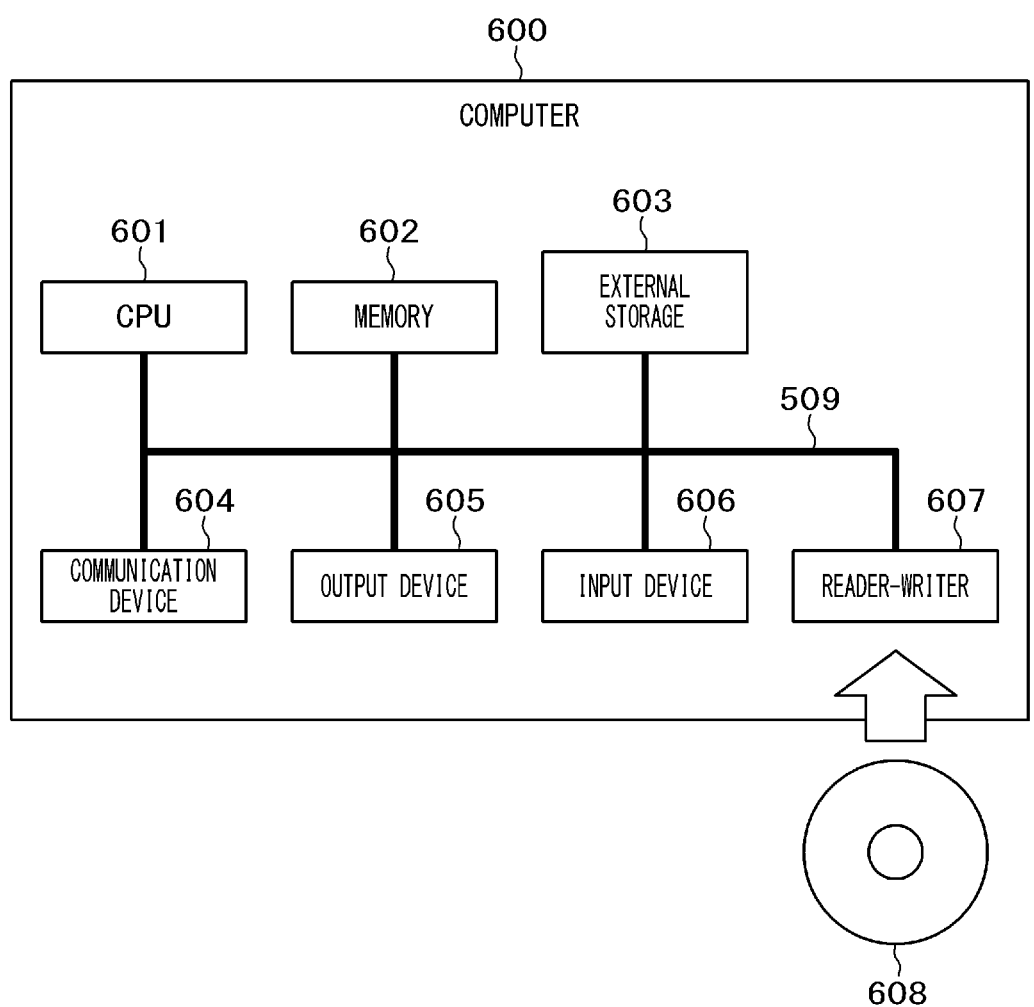
FIG. 6 shows a schematic configuration of a computer.

The above-mentioned registered client 100 can be realized by a general computer 600 shown in FIG. 6 (a schematic diagram showing the computer), for example, provided with a central processing unit (CPU) 601, a memory 602, an external storage 603 such as a hard disk drive (HDD), a reader-writer 607 that reads/writes information on a portable storage medium 608 such as a compact disk (CD) and a digital versatile disk (DVD), an input device 606 such as a keyboard and a mouse, an output device 605 such as a display, a communication device 604 such as a network interface card (NIC) for connecting to a communication network and an internal communication line (called a system bus) 609 such as a system bus for connecting these devices.

For example, the storage 120 can be realized when the CPU 601 utilizes the memory 602 or the external storage 603, the controller 110 and each processing unit included in the controller 110 can be realized by loading a predetermined program stored in the external storage 603 into the memory 602 and executing the program in the CPU 601, the input device 101 can be realized when the CPU 601 utilizes the input device 606, the output device 102 can be realized when the CPU 601 utilizes the output device 605, and the communication device 103 can be realized when the CPU 601 utilizes the communication device 604.

This predetermined program is stored (downloaded) in/into the external storage 603 from the storage medium 608 via the reader-writer 607 or from the network via the communication device 604, is then loaded into the memory 602, and may be also executed by the CPU 601. Besides, the predetermined program is directly loaded into the memory 602 from the storage medium 608 via the reader-writer 607 or from the network via the communication device 604 and may be also executed by the CPU 601.

Figure 4:
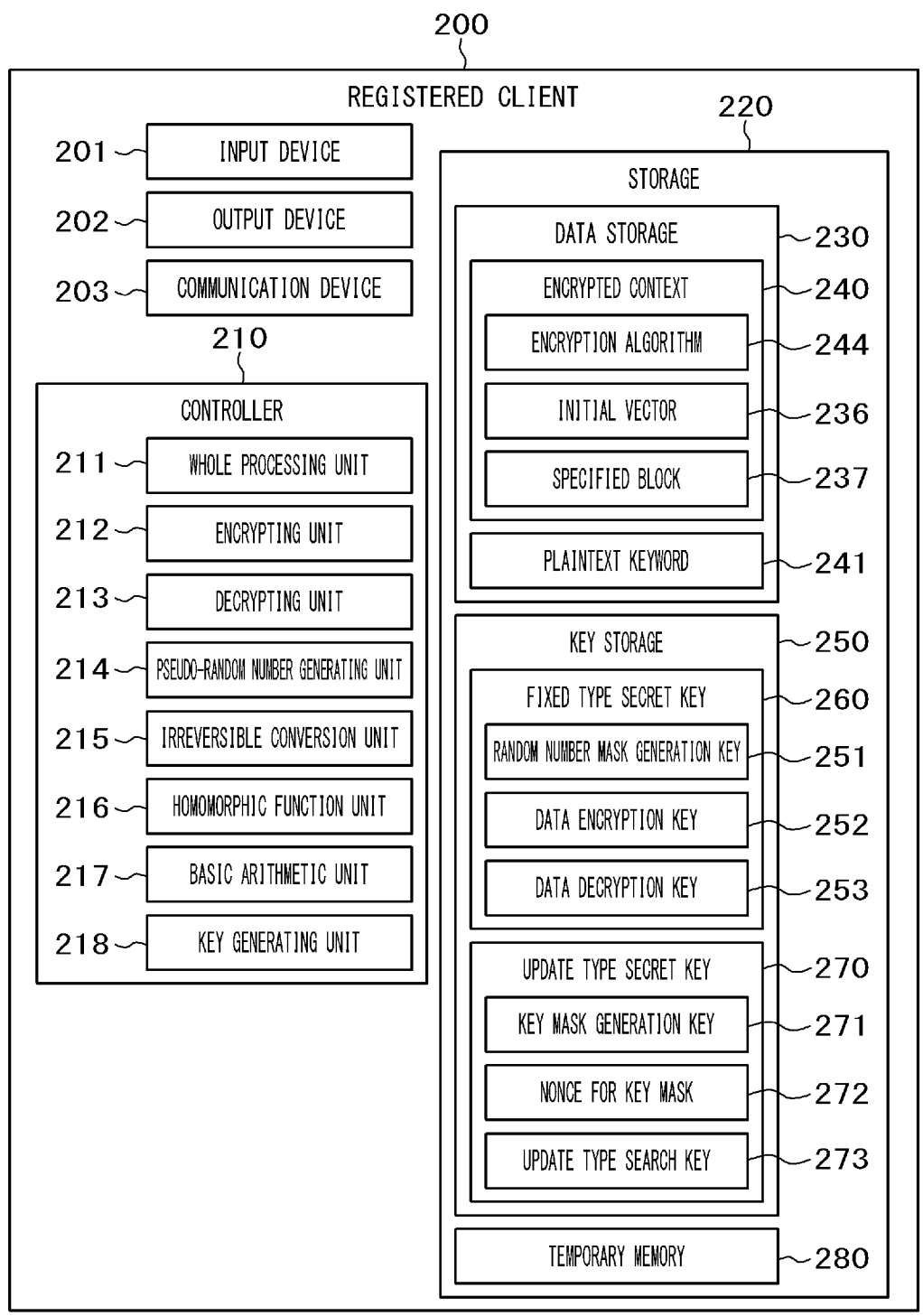
FIG. 4 is a schematic diagram showing functions of a search client.

FIG. 4 is a functional schematic diagram showing the search client 200. As shown in FIG. 4, the search client 200 is provided with a controller 210, a storage 220, an input device 201, an output device 202 and a communication device 203.

The storage 220 is provided with a data storage 230, a key storage 250 and a temporary memory 280.

The data storage 230 stores information for specifying a transmit statement which is data to be transmitted to the management server 300 and information for specifying data received via the communication device 203. In this embodiment, the data storage 230 stores information for specifying a plaintext keyword 241 which the search client 200 accepts via the input device 201. Besides, the data storage 230 stores information for specifying data received from the management server 300 via the communication device 203 as confidential data and stores data acquired by releasing confidentiality from the confidential data as plaintext data. Moreover, the data storage 230 stores an encryption context 240 in which information related to encryption is arranged. In a field of the encryption context 240, encryption algorithm 244 used for the release of confidentiality of confidential data and a confidential keyword, an initial vector 236 and a specified block 237 are stored. When data (including a keyword) upon which a confidential keyword is based is fixed to 128 bits or less, the initial vector 136 may be not necessarily used. In that case, no initial vector is required to be stored and processing related to the initial vector is omitted in all processing in the search client 200.

The key storage 250 stores information for specifying a fixed type secret key 260 and an updated type secret key 270 which are respectively to be secretly managed by the search client 200 from a viewpoint of security. The fixed type secret key 260 means a secret key continued to be also continuously utilized after a confidential data updation process disclosed in this embodiment and in a field of the fixed type secret key 260, information for specifying a random number mask generation key 251, a data encryption key 252 and a data decryption key 253 is stored. The update type secret key 270 means a secret key having different utilized secret keys before and after the confidential data updation process disclosed in this embodiment and in a field of the update type secret key, information for specifying a key mask generation key 271, a nonce for a key mask 272 and an update type search key 273 is stored. The update type secret key 270 includes a first secret key for a search for encrypting a plaintext keyword by the conventional type old secret key and a second secret key for a search for encrypting the plaintext keyword by the new secret key. Besides, in a field of the update type secret key, a first key mask generation key for a search and a first nonce for a key mask for a search respectively for generating the first secret key for a search, a second key mask generation key for a search and a second nonce for a key mask for a search respectively for generating the second secret key are stored.

The temporary memory 280 stores information required for processing in the controller 210.

The controller 210 is provided with a whole processing unit 211, an encrypting unit 212, a decrypting unit 213, a pseudo-random number generating unit 214, an irreversible conversion unit 215, a homomorphic function unit 216, a basic arithmetic unit 217 and a key generating unit 218. However, when no secret key generation process is performed, the key generating unit 218 is not required to be held.

The whole processing unit 211 controls all processing in the search client 200. For example, the whole processing unit 211 stores information the input of which is accepted via the input device 201 in the data storage 230 as a plaintext keyword 241.

Besides, the whole processing unit 211 displays the plaintext keyword 241 on the output device 202.

Moreover, the whole processing unit 211 reads the plaintext keyword 241 stored in the data storage 230, respectively inputs the read plaintext keyword to the encrypting unit 212, the pseudo-random number generating unit 214, the irreversible conversion unit 215, the homomorphic function unit 216 and the basic arithmetic unit 217, and stores respective output data in the data storage 230 as a confidential keyword.

In addition, the whole processing unit 211 transmits the confidential keyword to the management server 300 via the communication device 203.

Further, the whole processing unit 211 receives confidential data and plaintext data from the management server 300 via the communication device 203.

Furthermore, the whole processing unit 211 stores the confidential data and the plaintext data respectively received via the communication device 203 in the data storage 230.

Furthermore, the whole processing unit 211 reads confidential data stored in the data storage 230, respectively inputs the read confidential data to the decrypting unit 213, the irreversible conversion unit 215, the homomorphic function unit 216 and the basic arithmetic unit 217, and stores respective output data in the data storage 230 as plaintext data.

Furthermore, the whole processing unit 211 displays the plaintext data on the output device 202. Further, the whole processing unit 211 stores data received from the management server 300 via the communication device 203 in the temporary memory 280 and displays the data on the output device 202.

The encrypting unit 212 outputs data acquired by encrypting the input data.

For example, the encrypting unit 212 inputs a plaintext keyword 241 and a data encryption key 252 from the whole processing unit 211 and outputs an encrypted plaintext keyword.

The decrypting unit 213 decrypts input encrypted data and output the decrypted data.

For example, the decrypting unit 213 inputs encrypted data and a data decryption key 253 from the whole processing unit 211 and outputs its plaintext data after decryption.

The pseudo-random number generating unit 214 outputs a pseudo-random number.

For example, the pseudo-random number generating unit 214 is realized by installing standard pseudo-random number generation algorithm requiring a secret key and an initial vector. At this time, if one or both values of the secret key and the initial vector are changed every use, a different pseudo-random number is generated every time. Besides, for example, the pseudo-random number generating unit 214 is realized by hardware that outputs a random number on the basis of a physical phenomenon such as temperature, time and electric energy. In this embodiment, the pseudo-random number generating unit 214 outputs a pseudo-random number using a random number mask generation key 251 and an initial vector 236 respectively input from the whole processing unit 211.

The irreversible conversion unit 215 outputs data acquired by irreversibly converting input data. For example, the irreversible conversion unit 215 converts and outputs data input from the whole processing unit 211 to another fixed length data.

For example, the irreversible conversion unit 215 that converts arbitrary length input data to 256-bit data can be realized by installing SHA-256 which is standard cryptographic hash function algorithm.

The homomorphic function unit 216 outputs an output result of a homomorphic function based upon input data as data.

However, a homomorphic function shows a case that a mathematical expression 2 holds true for a function F, an input variable x and an input variable y. When homomorphism holds true by symbols of operation except EXCLUSIVE-OR (XOR) operation which is exclusive-OR every bit, the homomorphic function unit can be also similarly executed.

The basic arithmetic unit 217 executes processing related to basic arithmetic operation such as addition, subtraction, comparison operation, AND, OR and XOR.

The key generating unit 218 is used for generating a fixed type secret key and an update type secret key respectively used for encryption algorithm and the generation of a random number. For example, the key generating unit 218 is realized by installing standard key generation algorithm. Besides, a fixed type secret key and an update type secret key may be also generated using the pseudo-random number generating unit 214.

The above-mentioned search client 200 can be realized by the general computer provided with the CPU 601, the memory 602, the external storage 603 such as HDD, the reader-writer 607 that reads/writes information from/to the portable storage medium 608 such as CD and DVD, the input device 606 such as a keyboard and a mouse, the output device 605 such as a display, the communication device 604 for connecting to a communication network such as NIC and the internal communication line (called a system bus) for connecting these respectively shown in FIG. 6 (the schematic diagram showing the computer), for example.

For example, the storage 220 can be realized when the CPU 601 utilizes the memory 602 or the external storage 603, the controller 210 and each processing unit included in the controller 210 can be realized by loading a predetermined program stored in the external storage 603 into the memory 602 and executing the program in the CPU 601, the input device 201 can be realized when the CPU 601 utilizes the input device 606, the output device 202 can be realized when the CPU 601 utilizes the output device 605, and the communication device 203 can be realized when the CPU 601 utilizes the communication device 604.

This predetermined program is stored (downloaded) in the external storage 603 from the storage medium 608 via the reader-writer 607 or from the network via the communication device 604, then, is loaded into the memory 602, and may be also executed by the CPU 601. Besides, the predetermined program is directly loaded into the memory 602 from the storage medium 608 via the reader-writer 607 or from the network via the communication device 604 and may be also executed by the CPU 601.

Figure 5:
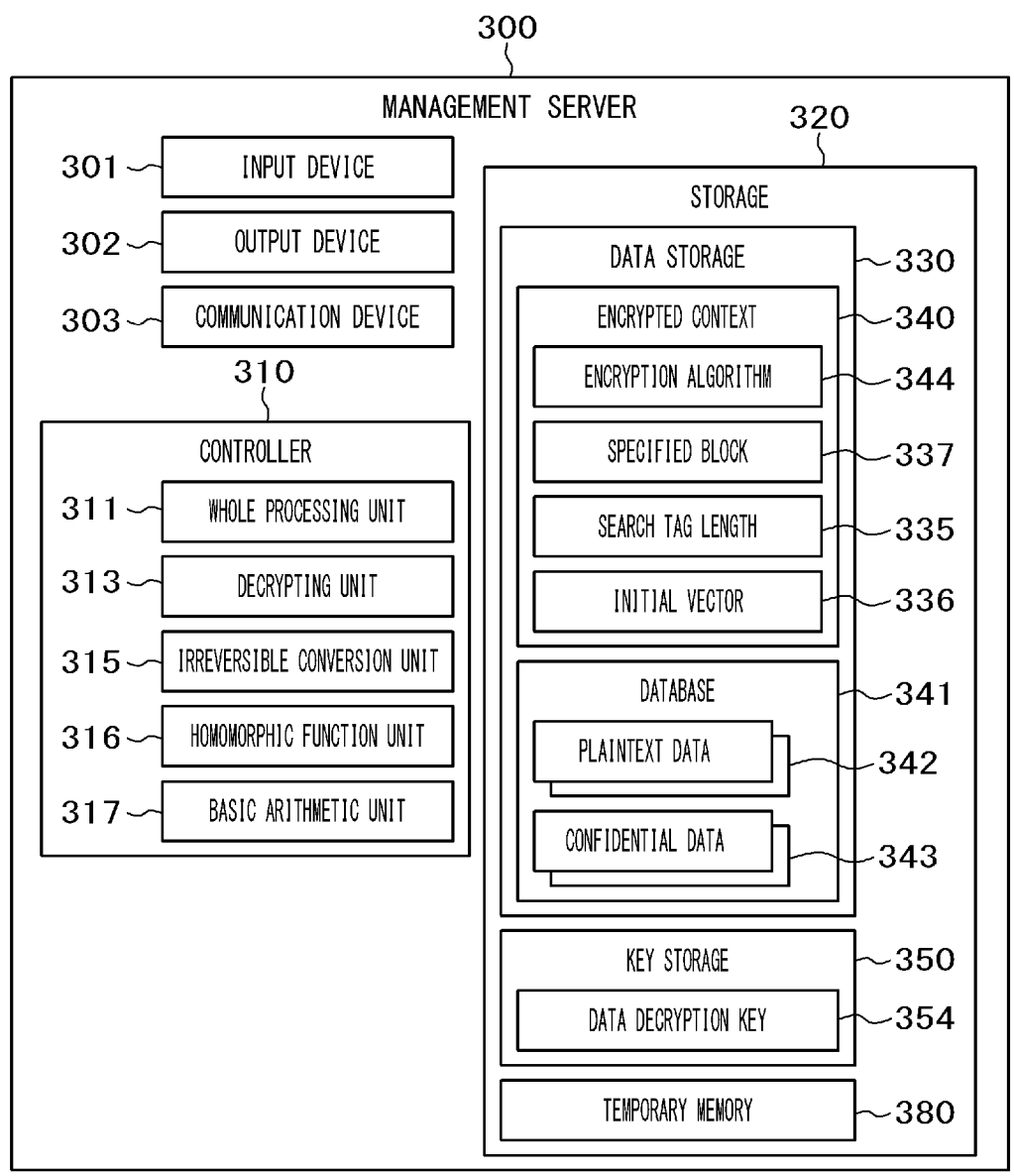
FIG. 5 is a schematic diagram showing functions of a management server.

FIG. 5 is a functional schematic diagram showing the management server 300. As shown in FIG. 5, the management server 300 is provided with a controller 310, a storage 320, an input device 301, an output device 302 and a communication device 303.

The storage 320 is provided with a data storage 330, a key storage 350 and a temporary memory 380.

The data storage 330 stores information for specifying data received via the communication device 303. In this case, in this embodiment, the data storage executes processing for storing information received from the registered client 100 via the communication device 303 in the data storage 303 as configuration information of the database 341. Besides, the data storage 330 stores information for specifying a keyword received via the communication device 303. In this case, in this embodiment, the data storage 330 executes processing for storing information received from the search client 200 via the communication device 303 as a confidential keyword.

Moreover, the data storage 330 stores an encryption context 340 in which information related to encryption is arranged and the database 341. The encryption context 340 stores encryption algorithm 344 used in generating confidential data, search tag length 335, an initial vector 336 and a specified block 337. The database 341 is configured by at least one of plaintext data and confidential data. For example, the database (DB) is configured by a relational database (RDB), a key-valued system (KVS) and others, and is stored as confidential data 343 in which each data managed as record in the database is made confidential or as plaintext data 342 in a state of plaintext or each data is stored in a pair of confidential data 343 and plaintext data 342.

The temporary memory 380 stores information required for processing in the controller 310.

The controller 310 is provided with a whole processing unit 311, a decrypting unit 313, an irreversible conversion unit 315, a homomorphic function unit 316 and a basic arithmetic unit 317.

The whole processing unit 311 controls all processing in the management server 300.

For example, the whole processing unit 311 receives confidential data and plaintext data from the registered client 100 via the communication device 303.

Besides, the whole processing unit 311 stores the confidential data 343 and the plaintext data 342 respectively received via the communication device 303 as configuration information of the database 341 in the data storage 330.

Moreover, the whole processing unit 311 receives a confidential keyword from the search client 200 via the communication device 303.

In addition, the whole processing unit 311 stores the confidential keyword received via the communication device 303 in the data storage 330.

Further, the whole processing unit 311 stores information related to data received from the search client 200 or the registered client 100 via the communication device 303 in the temporary memory 380 and displays the information on the output device 302.

The decrypting unit 313 outputs data acquired by decrypting input data.

For example, the decrypting unit 313 inputs encrypted data and an update type search key 354 from the whole processing unit 311, decrypts and outputs the data.

The irreversible conversion unit 315 outputs data acquired by irreversibly converting the input data.

For example, the irreversible conversion unit 315 converts data input from the whole processing unit 311 to another fixed length data and outputs the data.

For example, the irreversible conversion unit 115 that converts arbitrary length input data to 256-bit data can be realized by installing SHA-256 which is standard cryptographic hash function algorithm.

The homomorphic function unit 316 outputs an output result of a homomorphic function based upon input data as data.

However, the homomorphic function shows the case that the mathematical expression 2 holds true for the function F, the input variable x and the input variable y. When homomorphism holds true by symbols of operation except EXCLUSIVE-OR (XOR) operation which is exclusive-OR every bit, this embodiment can be also similarly executed.

The basic arithmetic unit 317 executes processing related to basic arithmetic operation such as addition, subtraction, comparison operation, AND, OR and XOR.

The above-mentioned management server 300 can be realized by the general computer provided with the CPU 601, the memory 602, the external storage 603 such as HDD, the reader-writer 607 that reads/writes information from/to the portable storage medium 608 such as CD and DVD, the input device 606 such as a keyboard and a mouse, the output device 605 such as a display, the communication device 604 for connecting to a communication network such as NIC and the internal communication line (called a system bus) for connecting these respectively shown in FIG. 6 (the schematic diagram showing the computer), for example.

For example, the storages 120, 220, 320 can be realized when the CPU 601 utilizes the memory 602 or the external storage 603, the controllers 110, 210, 310 and each processing unit included in the controllers 110, 210, 310 can be realized when a predetermined program stored in the external storage 603 is loaded into the memory 602 and is executed in the CPU 601, the input devices 101, 201, 301 can be realized when the CPU 601 utilizes the input device 606, the output devices 102, 202, 302 can be realized when the CPU 601 utilizes the output device 605, and the communication devices 103, 203, 303 can be realized when the CPU 601 utilizes the communication device 604.

This predetermined program is stored (downloaded) in/into the external storage 603 from the storage medium 608 via the reader-writer 607 or from the network via the communication device 604, then, is loaded into the memory 602, and may be also executed by the CPU 601. Besides, the predetermined program is directly loaded into the memory 602 from the storage medium 608 via the reader-writer 607 or from the network via the communication device 604 and may be also executed by the CPU 601.

<Confidential Data Registration Flow>

A sequence showing a process for the registered client 100 to register confidential data with the management server 300 via the network 400 will be described below.

The registered client 100 stores information input from a user via the input device 101 in the storage 120 as plaintext data 131 (S101).

The registered client 100 instructs the controller 110 to prepare confidential data (S102).

The registered client 100 transmits both or either of the plaintext data 1 and/or the confidential data to the management server 300 from the communication device 103 via the network 400 (S103).

The management server 300 receives both or either of the plaintext data and/or the confidential data respectively transmitted via the network 400 by the registered client 100 from the communication device 303 (S104).

The management server 300 instructs the controller 310 to store both or either of the received plaintext data and/or the received confidential data in the storage 320 as configuration information of the database 341 (S105).

The management server 300 transmits whether the plaintext data and/or the confidential data are/is registered or not to the registered client from the communication device 303 via the network 400 (S106).

The registered client 100 receives whether the plaintext data and/or the confidential data are/is registered or not transmitted by the management server 300 from the communication device 103 via the network 400 (S107).

The registered client 100 displays registration information including whether the registration process holds true or not on the output device 102 for the user (S108).

The sequence showing the process for the registered client 100 to register the confidential data with the management server 300 via the network 400 has been described.

The process procedure for this sequence is not necessarily required to comply with the above-mentioned order and the sequence may be also executed in different order. Besides, the above-mentioned procedure is not necessarily required to be all processed. For example, processing for duplicately encrypting a part or the whole of the confidential data prepared in S102 further using an update type search key and an update type secret key may be also added.

<Confidential Data Search Flow>

A sequence showing a process in which the management server 300 searches the database 341 using a confidential keyword transmitted by the search client 200 via the network 400 and further, the search client 200 acquires a search result will be described below.

The search client 200 stores information input from a user via the input device 201 in the storage 220 as a plaintext keyword 241 (S201).

The search client 200 instructs the controller 210 to prepare a confidential keyword on the basis of the plaintext keyword (S202).

The search client 200 transmits the confidential keyword to the management server 300 from the communication device 203 via the network 400 (S203).

The management server 300 receives the confidential keyword transmitted by the search client 200 from the communication device 303 via the network 400 (S204).

The management server 300 instructs the controller 310 to search the database 341 for confidential data 343 related to the confidential keyword (S205).

The management server 300 transmits a search result (configured by both or either of confidential data and/or plaintext data) corresponding to the confidential keyword to the search client from the communication device 303 via the network 400 (S206).

The search client 200 receives the search result transmitted by the management server 300 from the communication device 203 via the network 400 (S207).

When the confidential data is included in the search result, the search client 200 instructs the controller 210 to decrypt to be plaintext data on the basis of the search result corresponding to the confidential keyword (S208).

The search client 200 stores the plaintext data in the storage 220 via the output device 202 (S209).

The search client 200 displays the plaintext data on the output device 202 (S210).

The sequence showing the process in which the management server 300 searches the database 341 using the confidential keyword transmitted via the network 400 by the search client 200 and further, the search client 200 acquires the search result has been described.

The process procedure for this sequence is not necessarily required to comply with the above-mentioned order and the sequence may be also executed in different order. Besides, the above-mentioned procedure is not necessarily required to be all processed. Moreover, new processing may be also added. For example, when a part or the whole of confidential data to be searched is duplicately encrypted with an update type search key in S205, the management server 300 adds processing for decrypting the confidential data by the update type search key. Similarly, in S205, when a part or the whole of the confidential keyword is also duplicately encrypted with an update type search key, the management server 300 adds processing for decrypting the confidential keyword by the update type search key.

<Confidential Data Generation Flow>

Figure 7:
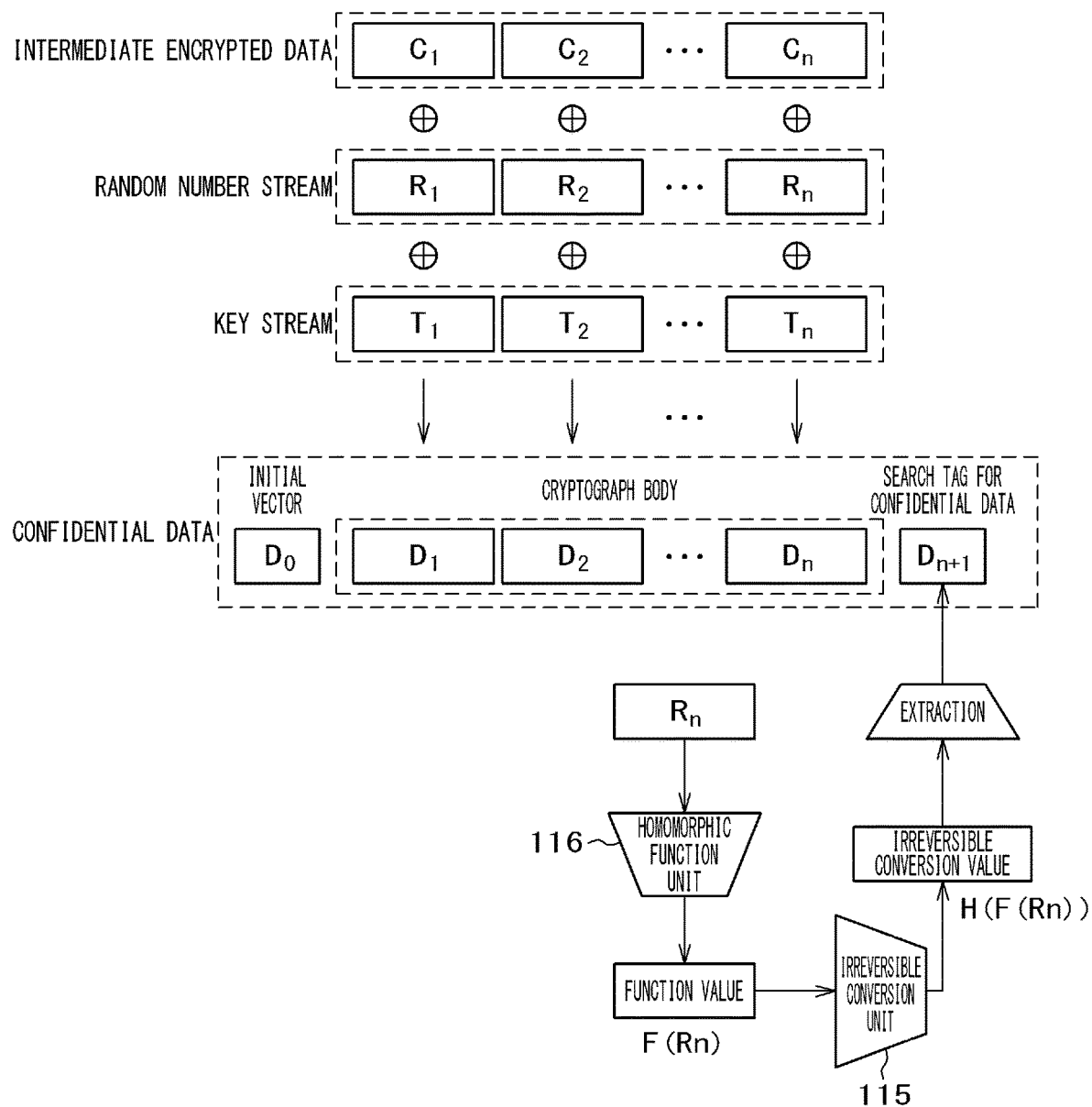
FIG. 7 is a block diagram showing a confidential data preparation procedure in the registered client.

FIG. 7 shows a procedure for a generation process of confidential data in the registered client 100. The whole processing unit 111 of the registered client 100 secures a work area required for the generation process of confidential data in the temporary memory 180.

The whole processing unit 111 of the registered client 100 acquires plaintext data 131 and the encrypting unit 112 divides the acquired plaintext data into processable size. The whole processing unit 111 of the registered client 100 inputs an initial vector 136, a data encryption key 152 and n pieces of divided plaintext blocks to the encrypting unit 112 and acquires n pieces of intermediate encrypted data C1, C2, - - - Cn encrypted according to encryption algorithm 141 such as an ECB mode and a CBC mode. For example, when an AES key in a CBC mode having key length of 256 bits is specified for the encryption algorithm 141, the plaintext data 131 is divided into plaintext blocks every 128 bits and the encrypting unit 112 outputs the intermediate encrypted data C1, C2, - - - Cn encrypted in the CBC mode of the AES key using the data encryption key 152 and the initial vector 136.

Figure 11A:
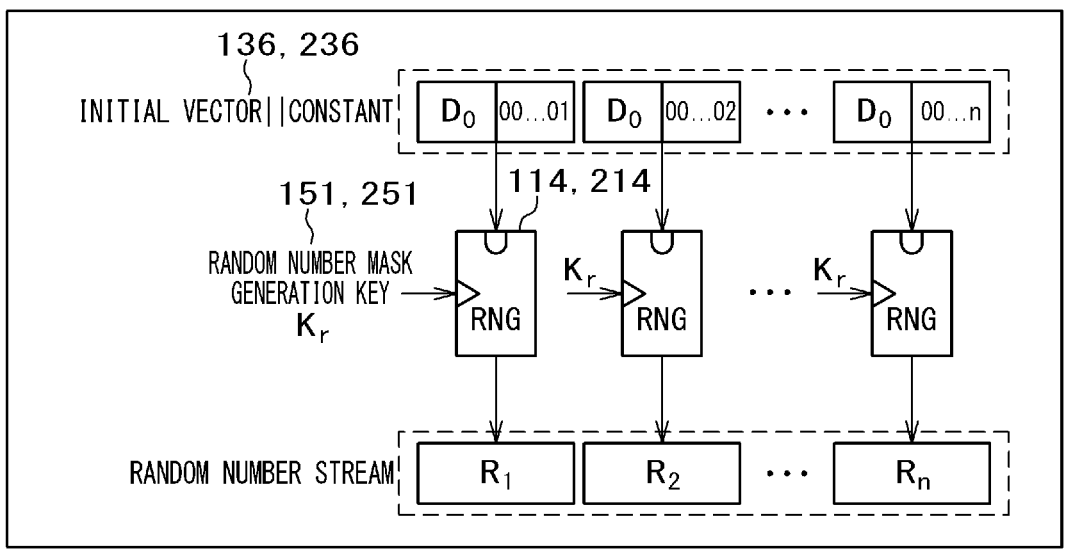
FIG. 11A is a block diagram showing a random number stream generation procedure in the registered client or the search client.

The whole processing unit 111 of the registered client 100 inputs the initial vector 136 and a random number mask generation key 151 to the pseudo-random number generating unit 114 so as to generate a random number stream used for n pieces of intermediate encrypted data. For example, as shown in FIG. 11A in FIG. 11, data in which the initial vector 136 and a constant are linked and the random number mask generation key 151 are input to the pseudo-random number generating unit 114 and a random number stream R1, R2, - - - Rn equivalent to n pieces of blocks are generated.

Figure 11B:
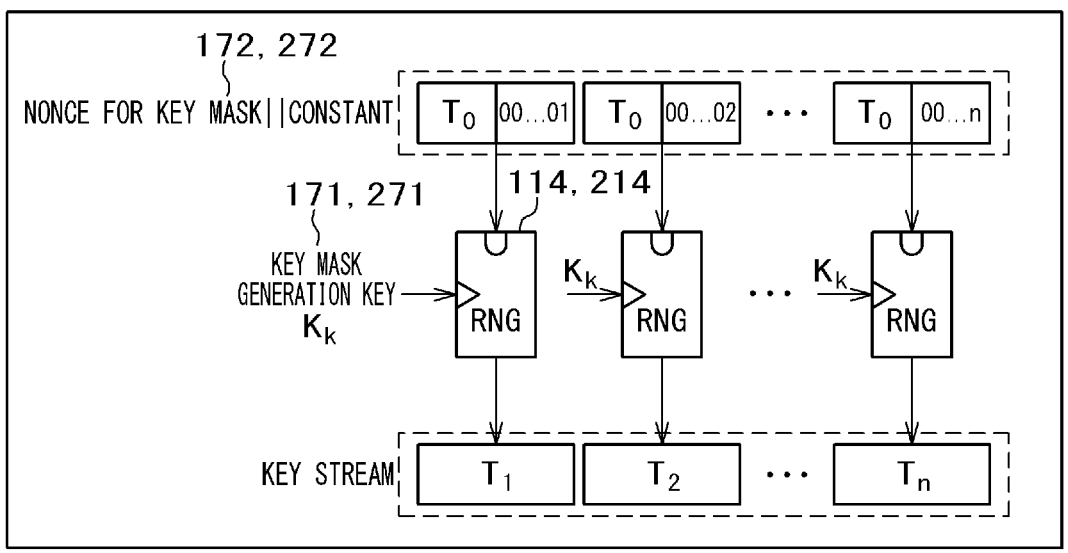
FIG. 11B is a block diagram showing a key stream generation procedure in the registered client or the search client.

The whole processing unit 111 of the registered client 100 inputs a nonce for a key mask 172 and a key mask generation key 171 to the pseudo-random number generating unit 114 so as to generate a key stream used for n pieces of intermediate encrypted data. For example, as shown in FIG. 11B in FIG. 11, data in which the nonce for a key mask 172 and a constant are linked and the key mask generation key 172 are input to the pseudo-random number generating unit 114 and a key stream T1, T2, - - - Tn equivalent to n pieces of blocks is generated.

The whole processing unit 111 of the registered client 100 inputs the intermediate encrypted data, the random number stream and the key stream to the basic arithmetic unit 117, the basic arithmetic unit 117 calculates their exclusive-OR (XOR), and the whole processing unit acquires an output result, D1, D2, - - - Dn as a body of a cryptograph.

$$Di = Ci \text{xor} Ri \text{xor} Ti \ (i=1, \text{ - - - } n) \quad \text{(Mathematical expression 3)}$$

The whole processing unit 111 of the registered client 100 inputs the whole or a part of the random number stream to the homomorphic function unit 116 and acquires output data as a function value. For example, as shown in FIG. 7, Rn which is a part of the random number stream is input to the homomorphic function unit 116 and a function value F(Rn) is acquired as an output result. The function value is input to the irreversible conversion unit 115 and an irreversible conversion value is acquired as output data. For example, when SHA-256 is installed in the irreversible conversion unit 115, a 256-bit hash value is equivalent to an irreversible conversion value H(F(Rn)).

Further, the irreversible conversion unit 115 acquires bits having bit length recorded in the search tag length 135 in the 256-bit hash value as a search tag for confidential data Dn+1. For example, the irreversible conversion unit 115 extracts the least significant 32 bits as a search tag for confidential data. However, bits extracted from the irreversible conversion value H are not limited to the least significant bits and the bits may be also extracted from the most significant bits, a fixed location or a random location.

The whole processing unit 111 of the registered client 100 stores data based upon D0 as the initial vector 136 and acquired by linking a cryptograph body D1, D2, - - - Dn and the search tag Dn+1 in the data storage 130 as confidential data.

The whole processing unit 111 of the registered client 100 releases the work area secured for generating the confidential data from the temporary memory 180.

A process for decrypting confidential data will be described later, however, in the above-mentioned process for generating the confidential data, the key stream generated on the basis of the key mask generation key 171 and the nonce for a key mask 172 is used. Accordingly, to generate confidential data, the key mask generation key 171 and the nonce for a key mask 172 are required. Besides, in the decryption process described later, the key mask generation key 271 and the nonce for a key mask 272 are required like the key mask generation key 171 and the nonce for a key mask 172 in generating confidential data.

The procedure for generating confidential data is not necessarily required to comply with the above-mentioned order and may be also different.

Besides, not the registered client 100 but the search client 200 may also generate confidential data.

<Confidential Keyword Generation Flow>

Figure 8:
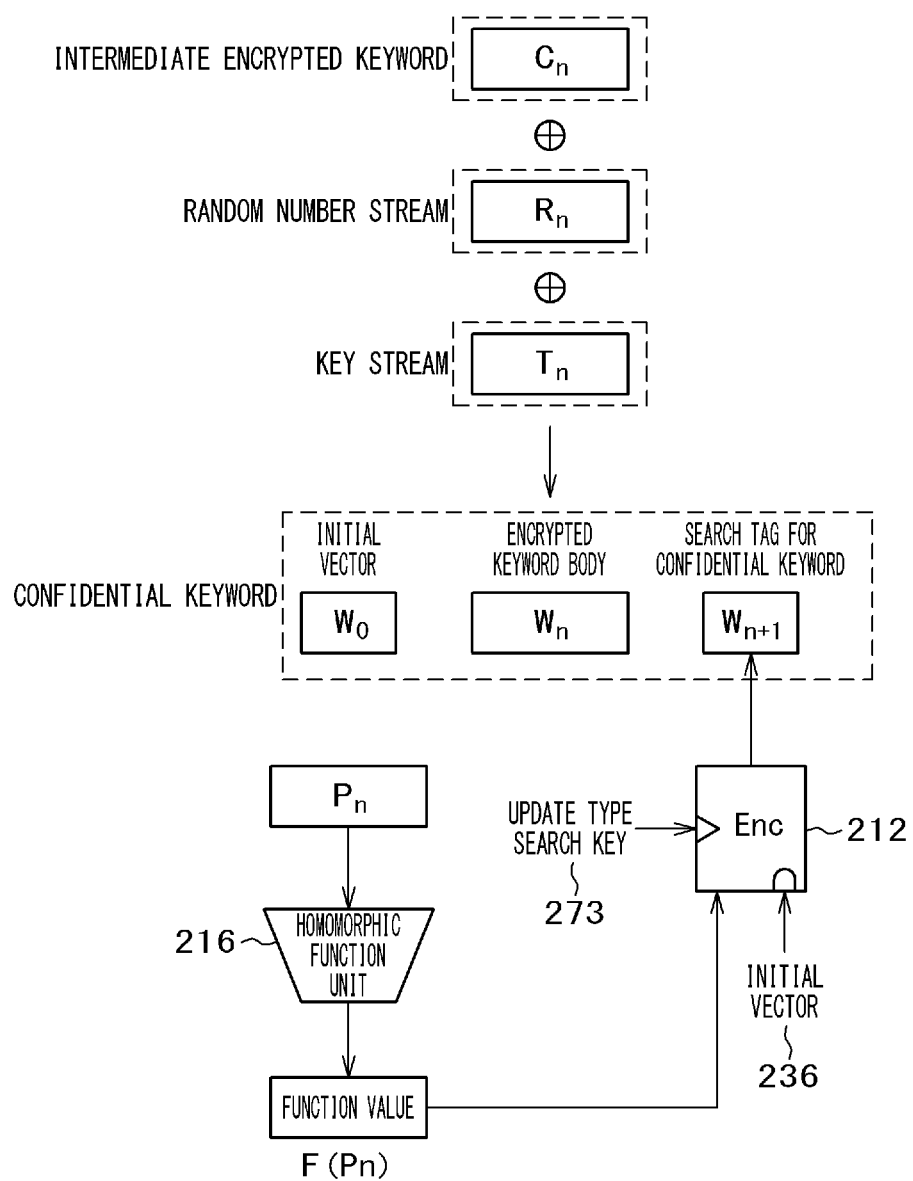
FIG. 8 is a block diagram showing a confidential keyword preparation procedure in the search client.

FIG. 8 shows a procedure for generating a confidential keyword in the search client 200.

The whole processing unit 211 of the search client 200 secures a work area required for generating a confidential keyword in the temporary memory 280.

The whole processing unit 211 of the search client 200 acquires a plaintext keyword 241 and generates a plaintext block according to description in the specified block 237. The whole processing unit 211 of the search client 200 inputs an initial vector 236, the data encryption key 252 and the plaintext block to the encrypting unit 212 and acquires an intermediate encrypted keyword Cn encrypted according to the encryption algorithm 244. For example, when the AES key in the CBC mode having key length of 256 bits is specified for the encryption algorithm 244 and the nth is specified in a field of the specified block 237, the whole processing unit 211 divides the plaintext keyword 241 into plaintext blocks every 128 bits and the encrypting unit 112 outputs Cn which is the nth data out of data C1, C2, - - - Cn encrypted in the CBC mode of the AES key using the data encryption key 252 and the initial vector 236 as an intermediate encrypted keyword.

The whole processing unit 211 of the search client 200 inputs the initial vector 236 and a random number mask generation key 251 to the pseudo-random number generating unit 214 and the pseudo-random number generating unit generates a random number stream used for a mask of the intermediate encrypted keyword. For example, when the nth is specified in the specified block 237, the whole processing unit generates a random number stream Pn equal to or exceeding size of the intermediate encrypted keyword Cn. At this time, as data values/a data value of both or either of the initial vector 250 and the random number mask generation key 251 are/is updated every time the random number stream is generated, the data value of the random number stream is different every time.

The whole processing unit 211 of the search client 200 inputs a nonce for a key mask 272 and a key mask generation key 271 to the pseudo-random number generating unit 214 and the pseudo-random number generating unit generates a key stream used for a mask of the intermediate encrypted keyword. For example, when the nth is specified in the specified block 237, the whole processing unit 211 generates a key stream Tn equal to or exceeding the size of the intermediate encrypted keyword Cn.

The whole processing unit 211 of the search client 200 inputs the intermediate encrypted keyword, the random number stream and the key stream to the basic arithmetic unit 217, the basic arithmetic unit 217 calculates their exclusive-OR (XOR), and the whole processing unit acquires an output result as a body of an encrypted keyword. For example, the following expression holds true for the intermediate encrypted keyword Cn, the random number stream Pn, the key stream Tn and the encrypted keyword Wn.

$$Wn = Cn \text{xor} Pn \text{xor} Tn \quad \text{(Mathematical expression 4)}$$

The whole processing unit 211 of the search client 200 inputs the random number stream Pn to the homomorphic function unit 216 and acquires output data as a function value F(Pn). The whole processing unit 211 of the search client 200 inputs an update type search key 273, the initial vector 236 and the function value to the encrypting unit 212 and acquires Wn+1 as a value of a search tag for a confidential keyword E(F(Pn)) as output data.

The whole processing unit 211 of the search client 200 links the initial vector 236, the body of the encrypted keyword and the search tag for a confidential keyword and stores this in the data storage 230 as a confidential keyword.

The whole processing unit of the search client 200 releases the work area secured for generating the confidential keyword from the temporary memory 280.

As described above, in the process for generating the confidential keyword, the key stream generated on the basis of the key mask generation key 271 and the nonce for a key mask 272 is used. Accordingly, the key mask generation key 271 and the nonce for a key mask 272 are required for generating the confidential keyword.

The procedure for generating the confidential keyword is not necessarily required to comply with the above-mentioned order and may be also different order. Besides, new processing may be also added. For example, the search tag for the confidential keyword is encrypted by the update type search key, however, similarly, processing duplicately encrypting the encrypted body which is another block of the confidential keyword may be also added.

Besides, not the search client 200 but the registered client 100 may also process the generation of the confidential keyword.

<Confidential Data Identity Comparison Flow>

Figure 9:
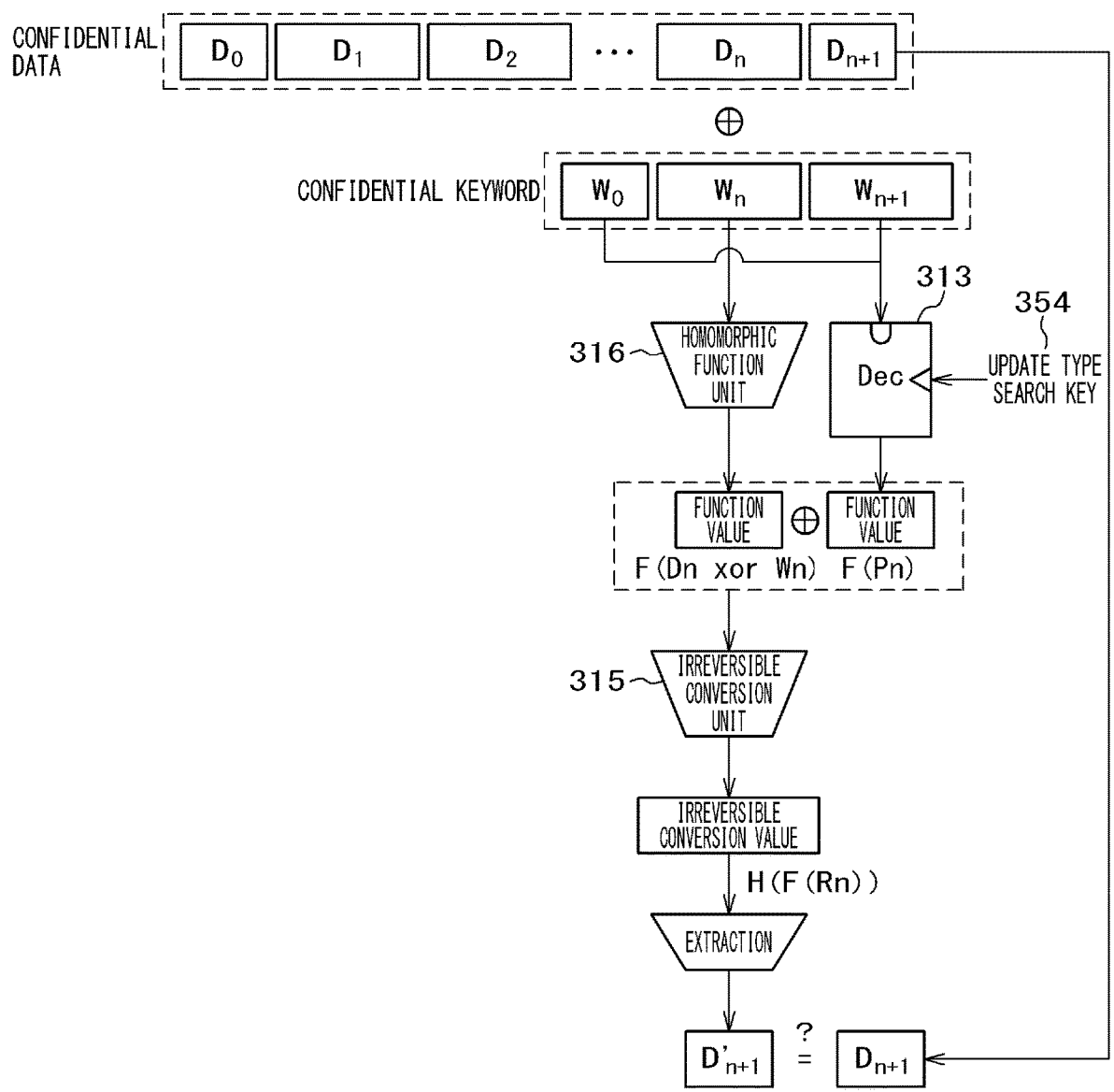
FIG. 9 is a block diagram showing a confidential data search procedure in the management server.

FIG. 9 shows a procedure for an identity comparison process of confidential data 343 and a confidential keyword in the management server 300. Concretely, FIG. 9 shows a procedure in which the management server 300 detects whether values of plaintext data not made confidential and a plaintext keyword are the same or not using the confidential data 343 and the confidential keyword.

The whole processing unit 311 of the management server 300 secures a work area required for the identity comparison process of the confidential data 343 in the temporary memory 380.

The whole processing unit 311 of the management server 300 acquires the confidential data 343 stored in the database 341. Further, the whole processing unit 311 extracts a cryptograph body corresponding to a specified block 337 from a cryptograph body in the confidential data 343. For example, when the nth is specified in the specified block 337, the whole processing unit 311 regards the confidential data 343 as data acquired by linking an initial vector, the cryptograph body and a search tag for confidential data and extracts a cryptograph body block Dn equivalent to the nth block from the corresponding cryptograph body.

The whole processing unit 311 of the management server 300 acquires an encrypted keyword body in the confidential keyword. For example, the whole processing unit regards a confidential keyword W as a set of blocks divided in three into an initial vector W0, an encrypted keyword body Wn and a search tag for a confidential keyword Wn+1 and extracts Wn equivalent to the encrypted keyword body.

The whole processing unit 311 of the management server 300 inputs the cryptograph body block and the encrypted keyword body to the basic arithmetic unit 317, the basic arithmetic unit 317 calculates their exclusive-OR (XOR), and the whole processing unit acquires an output result. For example, a mathematical expression 5 holds true for the cryptograph body block Dn and the encrypted keyword body Wn.

$Dn\text{xor}Wn=(Cn\text{xor}Rn\text{xor}Tn)\text{xor}(Cn\text{xor}Pn\text{xor}Tn)$ (Mathematical expression 5)

In this case, when the plaintext data and the plaintext keyword have the same value, a mathematical expression 6 can be led on the basis of the mathematical expression 5.

$Dn\text{xor}Wn=Rn\text{xor}Pn$ (Mathematical expression 6)

That is, values of intermediate encrypted data and an intermediate encrypted keyword are deleted and further, a value of a key stream that masks them is similarly deleted. Accordingly, as shown in the mathematical expression 6, the exclusive-OR of the cryptograph body block Dn and the encrypted keyword body Wn leaves only information of a random number stream (Rn and Pn).

The whole processing unit 311 of the management server 300 inputs the output result from the basic arithmetic unit 317 to the homomorphic function unit 316 and acquires a function value F (Dn xor Wn) which is an output result of the homomorphic function unit 316. A mathematical expression 7 holds true for the function value F (Dn xor Wn) on the basis of the mathematical expression 6.

$F(Dn\text{xor}Wn)=F(Rn\text{xor}Pn)$ (Mathematical expression 7)

The whole processing unit 311 of the management server 300 acquires the initial vector W0 in the confidential keyword and a search tag for a confidential keyword Wn+1, inputs them to the decrypting unit 313 together with an update type search key 354, and acquires a decrypted function value F (Pn).

The whole processing unit 311 of the management server 300 inputs the function value F(Dn xor Wn) and the function value F(Pn) to the basic arithmetic unit 317, the basic arithmetic unit 317 calculates their exclusive-OR (XOR), and the whole processing unit acquires an output function value F(R'n). For a calculation formula, a mathematical expression 8 holds true.

$$Z = F(Dn \text{ xor } Wn) \text{ xor } F(Pn) \quad \text{(Mathematical expression 8)}$$
$$= F(Rn \text{ xor } Pn) \text{ xor } F(Pn)$$
$$= F(Rn)$$

The whole processing unit 311 of the management server 300 inputs the function value F(Rn) to the irreversible conversion unit 315 and acquires an irreversible conversion value H(F(Rn)) as output data.

The whole processing unit 311 of the management server 300 extracts bit length recorded in a field of the search tag length 335 from the irreversible conversion value H. For example, the whole processing unit extracts the least significant 32 bits. Besides, not the least significant bits but the most significant bits may be also extracted and bits may be also extracted from a fixed location or a random location.

The basic arithmetic unit 317 compares extracted data and the search tag for confidential data, when they are the identical, the basic arithmetic unit outputs TRUE(=1) which means correspondence as an identity comparison result, and when they are not identical, the basic arithmetic unit outputs FALSE(=0) which means non-correspondence as the identity comparison result.

The whole processing unit 311 of the management server 300 releases the work area secured for the identity comparison process for confidential data from the temporary memory 380.

The procedure for comparing the identity of the confidential data and the confidential keyword is not necessarily required to comply with the above-mentioned order and may be also different order. Besides, others except TRUE and FALSE may be also used for a response of the identity comparison result and the response may be also multivalued in place of a binary response.

<Confidential Data Decryption Flow>

Figure 10:
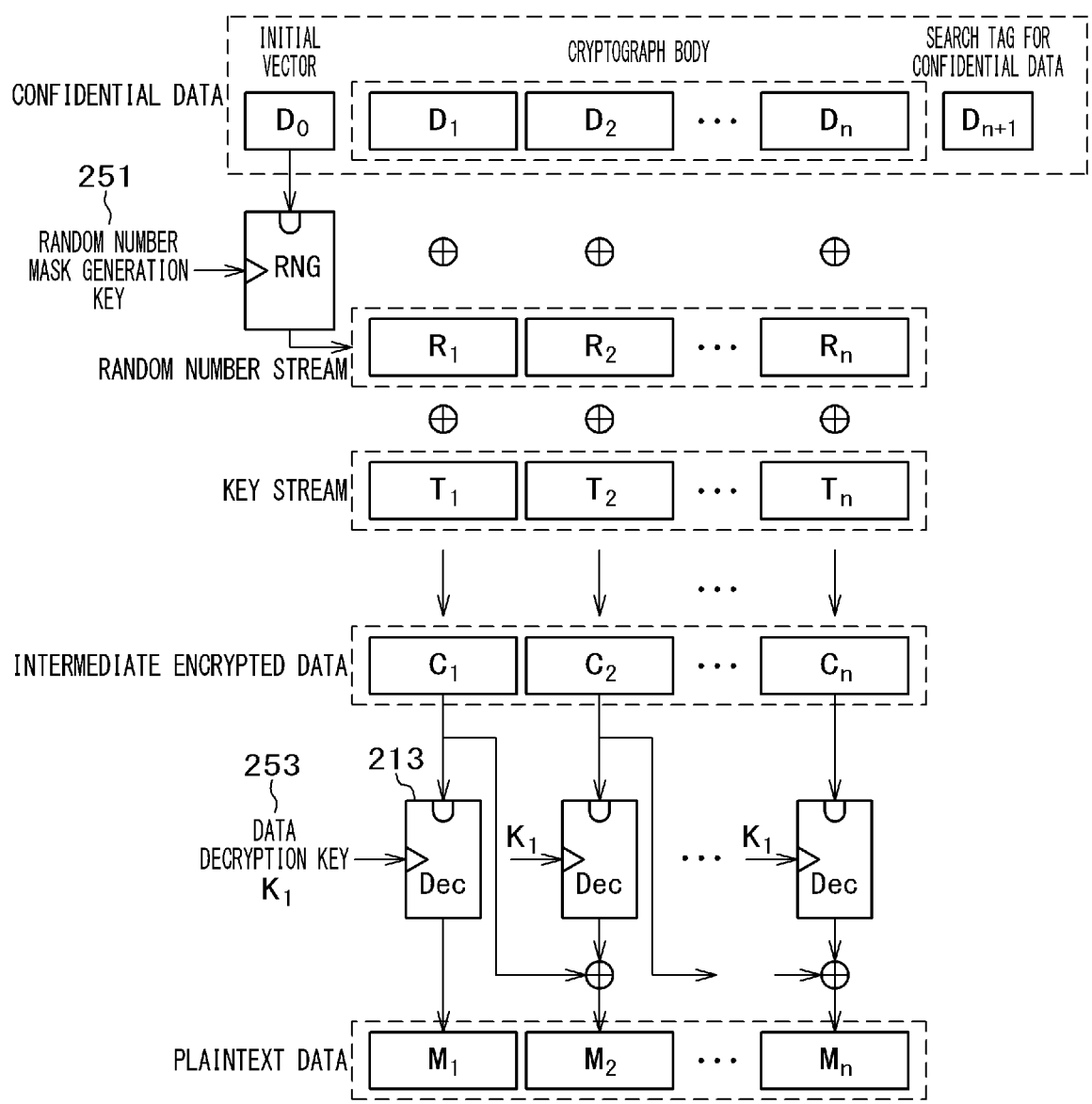
FIG. 10 is a block diagram showing a confidential data decryption procedure in the search client.

FIG. 10 shows a procedure for decrypting confidential data in the search client 200.

The whole processing unit 211 of the search client 200 secures a work area required for a process for decrypting confidential data in the temporary memory 280.

The whole processing unit 211 of the search client 200 acquires confidential data. Further, the whole processing unit acquires an initial vector from the confidential data. For example, the processing unit regards the confidential data as a set of blocks D0, D1, D2, - - - Dn, Dn+1 and acquires the initial vector D0 which is a first block.

The whole processing unit 211 of the search client 200 inputs the initial vector and a random number mask generation key 251 to the pseudo-random number generating unit 214 and the pseudo-random number generating unit generates a random number stream used releasing a mask of an intermediate encrypted keyword. For example, the whole processing unit 211 inputs data acquired by linking the initial vector and a constant and the random number mask generation key to the pseudo-random number generating unit 214, and the pseudo-random number generating unit generates a random number stream R1, R2, - - - Rn equivalent to n pieces of blocks as shown in FIG. 11A in FIG. 11.

The whole processing unit 211 of the search client 200 inputs a nonce for a key mask 272 and a key mask generation key 271 to the pseudo-random number generating unit 214 and the pseudo-random number generating unit generates a key stream used n pieces of intermediate encrypted data. For example, the whole processing unit inputs data acquired by linking the nonce for a key mask 272 and a constant and the key mask generation key 271 to the pseudo-random number generating unit 214 and the pseudo-random number generating unit generates a key stream T1, T2, - - - Tn equivalent to n pieces of blocks as shown in FIG. 11B in FIG. 11.

The whole processing unit 211 of the search client 200 inputs a cryptograph body, the random number stream and the key stream to the basic arithmetic unit 217, the basic arithmetic unit 217 calculates their exclusive-OR (XOR), and the whole processing unit acquires an output result C1, C2, - - - Cn as intermediate encrypted data.

$$Ci = Di \, xor \, Ri \, xor \, Ti \; (i=1, \text{-- -} n) \quad \text{(Mathematical expression 9)}$$

The whole processing unit 211 of the search client 200 inputs encryption algorithm 244, the initial vector 236, a data decryption key 253 and divided intermediate encrypted data to the decrypting unit 213 and acquires n pieces of intermediate encrypted data C1, C2, - - - Cn encrypted according to the encryption algorithm 244 such as the ECB mode and the CBC mode. For example, when the AES key in the CBC mode having key length of 256 bits is specified for the encryption algorithm 244, the whole processing unit divides the intermediate encrypted data into blocks every 128 bits, the decrypting unit 213 decrypts the blocks using the data decryption key 253 and the initial vector, and the decrypting unit outputs plaintext blocks M1, M2, - - - Mn decrypted in the CBC mode of the AES key.

Finally, the whole processing unit links the plaintext blocks M1, M2, - - - Mn and stores it in the data storage 230 as plaintext data.

The whole processing unit of the search client 200 releases the work area secured for decrypting the confidential data from the temporary memory 280.

The procedure for decrypting confidential data is not necessarily required to comply with the above-mentioned order and may be also different order.

Besides, not the search client 200 but the registered client 100 may also process the decryption of confidential data.

<Update Type Secret Key Updation Flow>

A process for updating an update type secret key 170 in the registered client 100 will be described below. An old update type secret key is invalidated by utilizing this processing, and only the registered client and the search client respectively provided with a new update type secret key can realize normal operation.

The registered client 100 generates an update type secret key 170 using the key generating unit 118 (S1001). For example, the registered client individually generates a key mask generation key 171 and a nonce for a key mask 172 using key generation algorithm. The update type secret key 170 is configured by the key mask generation key 171 and the nonce for a key mask 172, however, both may be also generated, and either may be also generated.

The registered client 100 updates confidential data 343 in the management server 300 via the network 400 using the newly generated update type secret key 170 (S1002). A confidential data updation flow will be described later.

After the confidential data updation flow is finished, the registered client registers the update type secret key 170 generated in S1001 in the key storage 150 as a new update type secret key 170 (S1003).

The registered client 100 registers the update type secret key with the search client 200 via the network (S1004).

The procedure for updating the update type secret key 170 is not necessarily required to comply with the above-mentioned order.

Besides, a part of the process may be also replaced with another processing. For example, an update type secret key 170 may be also acquired via the input device 101 or the communication device 103 in place of generating the update type secret key 170 in S1001.

Moreover, new processing may be also added. For example, the registered client 100 may also delete the old update type secret key 170 after the registered client registers the new update type secret key 170 generated in S1003.

In addition, not the registered client 100 but the search client 200 may also update the update type secret key 170.

<Update Type Search Key Updation Flow>

A process for updating an update type search key 273 in the search client 200 will be described below. An old update type search key is invalidated by utilizing this process, and only the search client 200 and the management server 300 respectively provided with the new update type search key can realize normal operation.

The search client 200 generates an update type search key 273 which is one component of the update type secret key 270 using the key generating unit 218 (S1101). For example, the search client generates the update type search key 273 using key generation algorithm.

The search client 200 registers the update type search key 273 with the management server 300 via the network 400 (S1102).

The search client registers the update type search key 273 generated in S1001 with the key storage 250 as a new update type search key 273 (S1003).

The procedure for updating the update type search key 273 is not necessarily required to comply with the above-mentioned order.

Besides, a part of the process may be also replaced with another processing. For example, an update type search key 273 may be also acquired via the input device 201 or the communication device 203 in place of generating the update type search key 273 in S1101.

Moreover, new processing may be also added. For example, the search client 200 may also delete the old update type search key 273 after the search client registers the new update type search key 273 generated in S1103.

In addition, not the search client 200 but the management server 300 may also update the update type search key 273. At that time, in S1102, the search client 200 acquires the update type search key 273 from the management server 300 via the network 400.

<Confidential Data Updation Flow>

According to the updation of the update type secret key by the registered client 100, a process for updating confidential data deposited in the management server 300 (corresponding to replacement from the old update type secret key to a new update type secret key) is performed. A sequence showing a process in which the management server 300 updates confidential data 343 in the database 341 using a difference key mask transmitted via the network 400 by the registered client 100 will be described below.

The registered client 100 transmits an inquiry concerning size of the confidential data 343 to the management server 300 from the communication device 103 via the network 400 (S301).

The management server 300 receives the inquiry transmitted via the network 400 by the registered client 100 from the communication device 303 (S302).

The management server 300 transmits the size of the confidential data to the registered client 300 from the communication device 303 via the network 400 (S303).

The registered client 100 receives the size of the confidential data transmitted via the network 400 by the management server 300 from the communication device 103 (S304).

The whole processing unit 311 of the management server 300 subtracts each size of the initial vector and the search tag for confidential data from the size of the confidential data using the basic arithmetic unit 317 and calculates size of the cryptograph body (S305).

The whole processing unit 311 of the management server 300 regards size exceeding the cryptograph body as size of a generated difference key mask and transmits the size to the registered client 100 (S306).

The registered client 100 instructs the controller 110 to generate a difference key mask of the size received from the management server 300 (S307).

The registered client 100 transmits the generated difference key mask to the management server 300 from the communication device 103 via the network 400 (S308).

The management server 300 receives the difference key mask transmitted via the network 400 by the registered client 100 from the communication device 303 (S309).

The management server 300 instructs the controller 310 to update the confidential data 343 which is configuration information of the database 341 using the received difference key mask and to store the updated confidential data 343 in the storage 320 (S310).

The management server 300 transmits whether the confidential data 343 is updated or not to the registered client 100 from the communication device 303 via the network 400 (S311).

The registered client 100 receives whether the confidential data 343 is updated or not transmitted via the network 400 by the management server 300 from the communication device 103 (S312).

The registered client 100 displays information of whether the confidential data 343 is updated or not for a user via the output device 102 (S313).

The procedure for this sequence is not necessarily required to comply with the above-mentioned order and may be also different order. Besides, the above-mentioned procedure is not necessarily required to be all processed. Moreover, a part of the process may be also replaced with another processing. For example, in S306, a predetermined value may be also regarded as the size of the difference key mask. In addition, processing may be also further added. For example, after S310 is finished, the registered client may also delete the update type secret key corresponding to the confidential data before updation. Further, the search client 200 may also fulfill a role of the registered client 100 in place of the registered client 100.

Only the process for updating the update type secret key has been described, however, a process for updating the update type search key may be also executed together. For the updation process of the update type search key, the search client transmits a new update type search key to the management server and the management server has only to deposit it. Besides, the updation process of the update type search key may be also executed in the search client and the management server. Moreover, when plural registered clients, plural search clients or plural management servers exist, the management server may also utilize an update type search key different every registered client or every search client.

<Difference Key Mask Generation Flow>

A difference key mask denotes difference between two types of key streams respectively independently generated on the basis of a new secret key and an old secret key respectively held by the registered client 100. The management server 300 can update the confidential data to confidential data corresponding to the new secret key from the old secret key owing to the difference key mask which is generated on the basis of the two types of secret keys and which is difference between the two types of key streams as described later.

Figure 12:
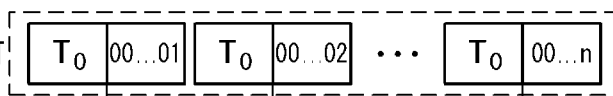
FIG. 12 is a block diagram showing a difference key mask generation procedure in the registered client.
Figure 12:
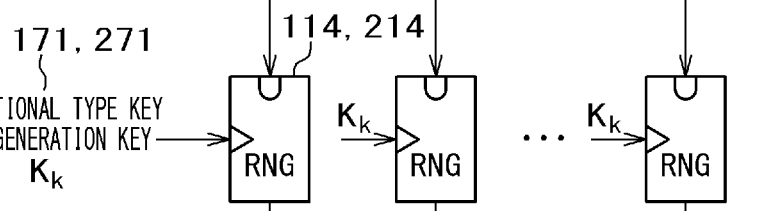
Figure 12:
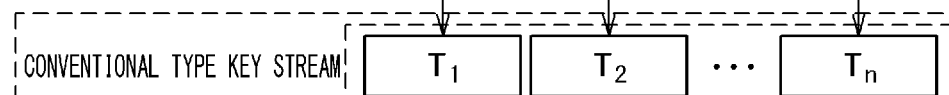
Figure 12:
Figure 12:
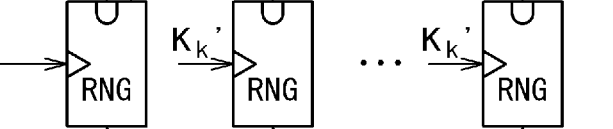
Figure 12:
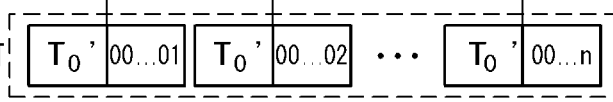

A procedure for generating a difference key mask in the registered client 100 will be described referring to FIG. 12 below.

The registered client 100 holds a new nonce for a key mask 172' and a new key mask generation key 171' in addition to a conventional type nonce for a key mask 172 and a conventional type key mask generation key 171 respectively required for a generation process of the difference key mask.

The whole processing unit 111 of the registered client 100 secures a work area required for the generation process of the difference key mask in the temporary memory 180.

The whole processing unit 111 of the registered client 100 inputs the conventional type nonce for a key mask 172 and the conventional type key mask generation key 171 to the pseudo-random number generating unit 114 and the pseudo-random number generating unit generates a conventional type key stream used for n pieces of intermediate encrypted data. For example, as shown in FIG. 11B in FIG. 11, the whole processing unit inputs data acquired by linking the conventional type nonce for a key mask 172 and a constant and the conventional type key mask generation key 171 to the pseudo-random number generating unit 114 and the pseudo-random number generating unit generates a conventional type key stream T1, T2, - - - Tn equivalent to n pieces of blocks.

The whole processing unit 111 of the registered client 100 inputs the new nonce for a key mask 172' and the new key mask generation key 171' to the pseudo-random number generating unit 114 and the pseudo-random number generating unit generates a new key stream used for n pieces of intermediate encrypted data. For example, as shown in FIG. 11B in FIG. 11, the whole processing unit inputs data acquired by linking the new nonce for a key mask 172' and a constant and the new key mask generation key 171' to the pseudo-random number generating unit 114 and the pseudo-random number generating unit generates a new key stream T1', T2', - - - Tn' equivalent to n pieces of blocks.

The whole processing unit 111 of the registered client 100 inputs the conventional type key stream and the new key stream to the basis arithmetic unit 117, the basic arithmetic unit calculates their exclusive-OR (XOR), and the whole processing unit acquires an output result S1, S2, - - - Sn as a difference key mask.

$$Si = Ti \text{ xor } Ti' \ (i=1, \text{---} n) \quad \text{(Mathematical expression 10)}$$

The new key stream Ti' is masked by the conventional type key stream Ti, and only the registered client 100 or only the search client 200 which respectively hold the conventional type nonce for a key mask 172 and the conventional type key mask generation key 171 can release the mask. Accordingly, a value of the new key stream Ti' or a value of the conventional type key stream Ti is never directly leaked to the management server 300.

The whole processing unit 111 of the registered client 100 releases the work area secured for the generation process of the difference key mask from the temporary memory 180.

The procedure for generating the difference key mask is not necessarily required to comply with the above-mentioned order and may be also different order.

Besides, not the registered client 100 but the search client 200 may also generate the difference key mask. In this case, the search client has only to use the new nonce for a key mask 272' and the new key mask generation key 271' in addition to the conventional type nonce for a key mask 272 and the conventional type key mask generation key 271 which are respectively held by the search client 200. Hereby, the search client can update the confidential keyword using the difference key mask.

<Confidential Data Updation Flow>

Figure 13:
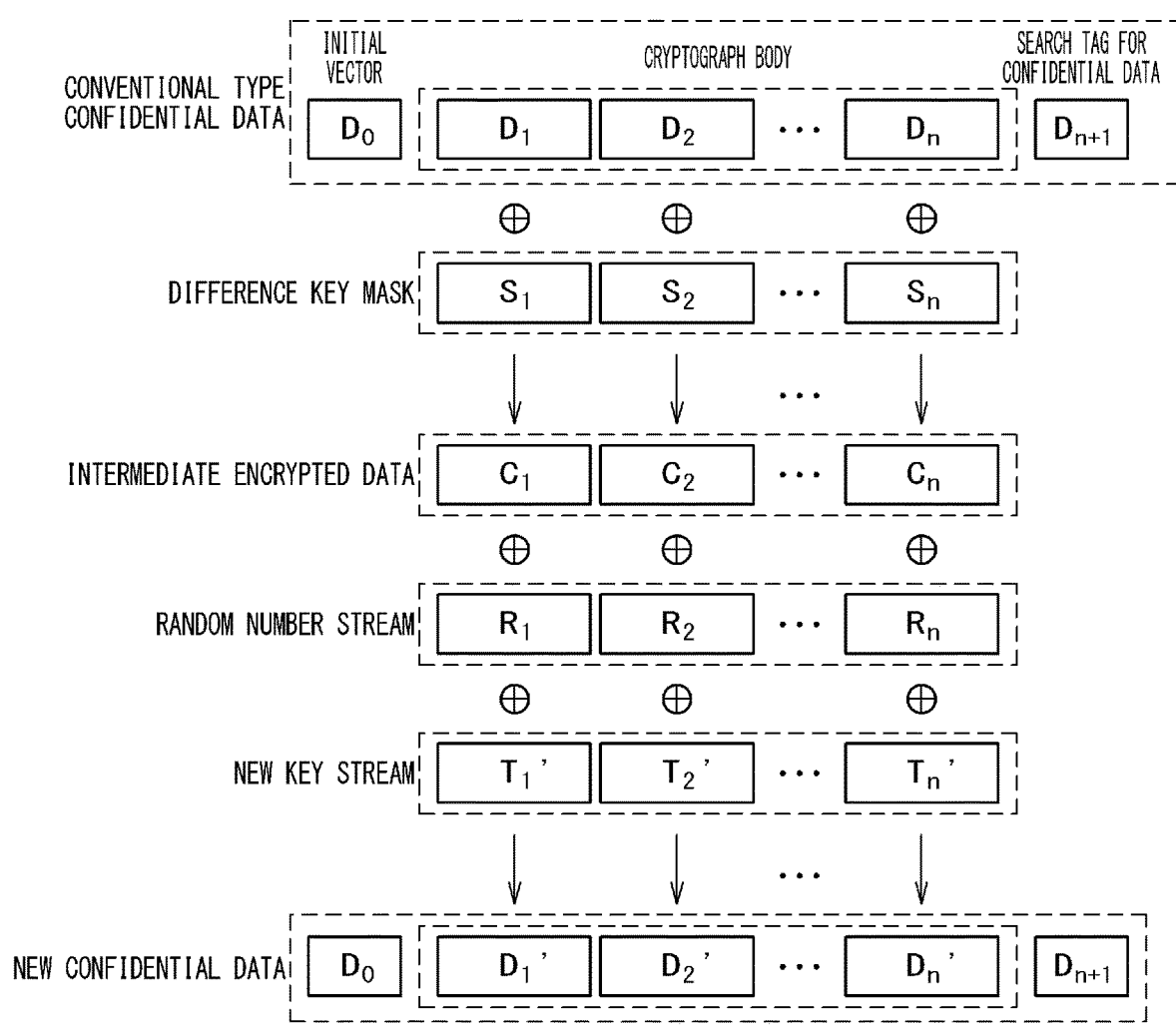
FIG. 13 is a block diagram showing a confidential data update procedure in the management server.

FIG. 13 shows a procedure for updating confidential data in the management server 300.

The whole processing unit 311 of the management server 300 secures a work area required for a re-encryption process of confidential data 343 in the temporary memory 380.

The whole processing unit 311 of the management server 300 acquires confidential data 343 stored in the database 341. Further, the whole processing unit extracts a cryptograph body from the confidential data 343.

The whole processing unit 311 of the management server 300 inputs the conventional type cryptograph body and a conventional type key stream to the basic arithmetic unit 317, the basic arithmetic unit calculates their exclusive-OR (XOR), and the whole processing unit acquires an output result D1', D2', - - - Dn' as a new cryptograph body.

In this case, a mathematical expression 11 holds true for a calculation formula.

$$Di' = Di \text{ xor } Si \quad \text{(Mathematical expression 11)}$$
$$= (Ci \text{ xor } Ri \text{ xor } Ti) \text{ xor } (Ti \text{ xor } Ti')$$
$$= Ci \text{ xor } Ri \text{ xor } Ti'$$

$$(i = 1, \text{---} n)$$

According to the mathematical expression 11, the conventional type cryptograph body is calculated (Di=Ci xor Ri xor Ti) by exclusive-OR (xor) of an intermediate cryptograph Ci, a random number stream Ri and the conventional type key stream Ti, however, the new cryptograph body is calculated (Di'=Ci xor Ri xor Ti') by exclusive-OR (xor) of an intermediate cryptograph Ci, the random number stream Ri and a new key stream Ti'. Accordingly, the conventional type key stream Ti is converted to the new key stream Ti'.

The whole processing unit of the management server 300 stores data acquired by linking an initial vector 336, the cryptograph body D1', D2', - - - Dn' and a search tag Dn+1 in the data storage as new confidential data.

The new confidential data requiring not the conventional type key mask generation key and the nonce for a key mask but a new key mask generation key and a nonce for a key mask for decrypting this confidential data is generated.

The whole processing unit of the management server 300 releases the work area secured for the updation process of the confidential data 343 from the temporary memory 380.

The procedure for updating confidential data in the management server 300 is not necessarily required to comply with the above-mentioned order and may be also different order.

Second Embodiment

In a second embodiment, in a system where a registered client 100, a search client 200 and a management server 300 are connected via a network 500 and a network 600, confidential data generated by the registered client 100 is registered with the management server 300, the management server 300 updates the confidential data to confidential data made to correspond to a secret key held by the search client 200 by a difference key mask, the search client 200 requests the management server 300 to search for the confidential data, and the search client can decrypt the confidential data acquired from the management server 300. When plural search clients 200 respectively hold a different secret key, the management server also updates to confidential data made to correspond to the secret key held by each search client 200 by a difference key mask held by the management server 300 and each search client can convert the confidential data to decrypted confidential data.

Figure 14:
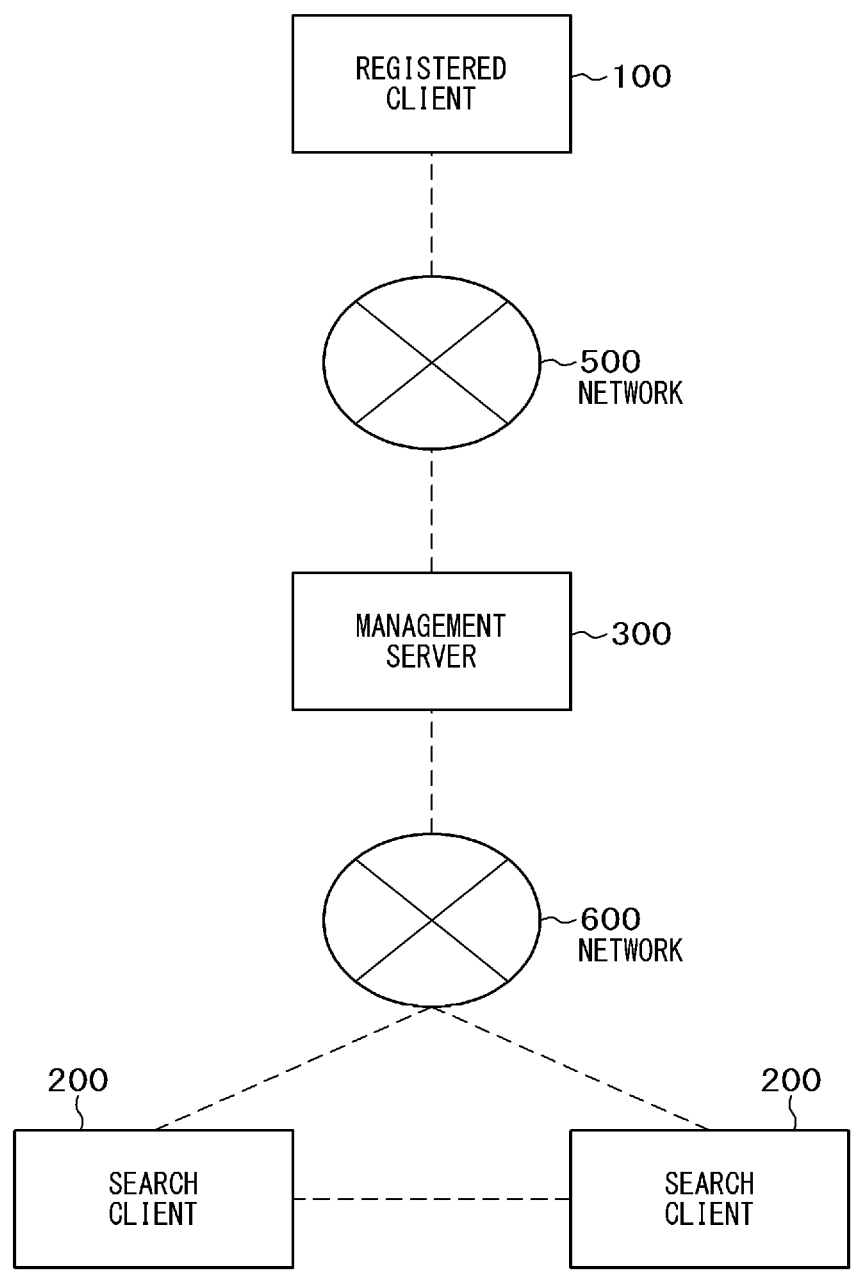
FIG. 14 is a schematic diagram showing a system equivalent to a second embodiment.

FIG. 14 is a schematic diagram showing the system equivalent to this embodiment. As shown in FIG. 14, a search processing system is provided with the registered client 100, the search client 200 and the management server 300 and is configured so that the registered client 100 and the management server 300 can transmit/receive information via the network 500 and the search client 200 and the management server 300 can transmit/receive information via the network 600.

The registered client 100 and the search client 200 in this embodiment are similar to those in the first embodiment, however, at least either of a key mask generation key 171 and a nonce for a key mask 172 in an update type secret key 170 or a key mask generation key 271 and a nonce for a key mask 272 in an update type secret key 270 has different values.

Figure 15:
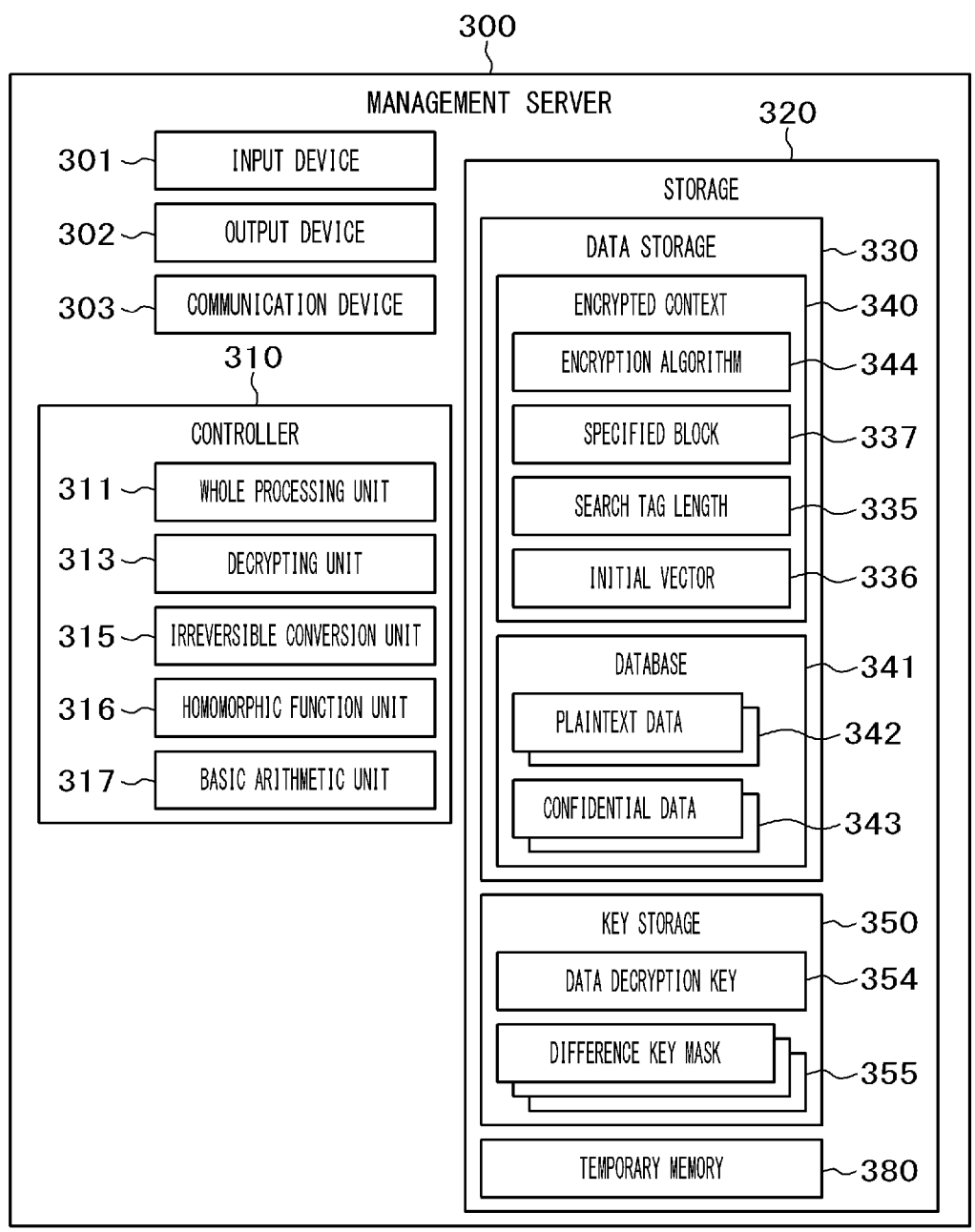
FIG. 15 is a schematic diagram showing functions of a management server.

The management server 300 in this embodiment is similar to that in the first embodiment as shown in FIG. 15, however, the management server in this embodiment is different from that in the first embodiment in that a key storage in a storage 320 holds the difference key mask 355. The difference key mask 355 is generated using all combinations or a part of them of the key mask generation key 171 and the nonce for a key mask 172 respectively held by the registered client 100, the key mask generation key 271 and the nonce for a key mask 272 respectively held by the search client 200. A process for generating the difference key mask 355 uses the key mask generation key 171 and the nonce for a key mask 172 respectively held by the registered client 100, the key mask generation key 271 and the nonce for a key mask 272 respectively held by the search client 200 as described later.

<Difference Key Mask Generation Flow>

A procedure for generating the difference key mask by the registered client 100 will be described below.

The registered client 100 holds a nonce for a key mask 171 and a key mask generation key 172, a nonce for a key mask 271 and a key mask generation key 272 respectively distributed to the search client 200.

The whole processing unit 111 of the registered client 100 secures a work area required for generating a difference key mask in the temporary memory 180.

The whole processing unit 111 of the registered client 100 inputs the nonce for a key mask 171 and the key mask generation key 172 to the pseudo-random number generating unit 114 and the pseudo-random number generating unit generates a key dream (1) used for n pieces of intermediate encrypted data. For example, as shown in FIG. 11B in FIG. 11, the whole processing unit inputs data acquired by linking the nonce for a key mask 171 and a constant and the key mask generation key 172 to the pseudo-random number generating unit 114 and the pseudo-random number generating unit generates T1, T2, - - - Tn as the key stream (1) equivalent to n pieces of blocks.

The whole processing unit 111 of the registered client 100 inputs the nonce for a key mask 271 and the key mask generation key 282 to the pseudo-random number generating unit 114 and the pseudo-random number generating unit generates a key stream (2) used for n pieces of intermediate encrypted data. For example, as shown in FIG. 11B in FIG. 11, the whole processing unit inputs data acquired by linking the nonce for a key mask 171 and a constant and the key mask generation key 172 to the pseudo-random number generating unit 114 and the pseudo-random number generating unit generates T1', T2', - - - Tn' as a key stream (2) equivalent to n pieces of blocks.

The whole processing unit 111 of the registered client 100 inputs the key stream (1) and the key stream (2) to the basic arithmetic unit 117, the basic arithmetic unit 117 calculates their exclusive-OR (XOR), and the whole processing unit acquires an output result S1, S2, - - - Sn as a difference key mask.

$Si = Ti \text{ xor } Ti' (i=1,n)$ (Mathematical expression 12)

The whole processing unit 117 of the registered client 100 releases the work area secured for generating the difference key mask from the temporary memory 180.

The procedure for generating the difference key mask is not necessarily required to comply with the above-mentioned order and may be also different order.

Besides, it is described above that the registered client 100 generates the difference key mask, however, the search client 200 generates the difference key mask, and the search client may also distribute it to the registered client 100.

Moreover, a new reliable mechanism and others may be also prepared for generating a difference key mask.

<Difference Key Mask Registration Flow>

A sequence showing a process in which the management server 300 transmits a difference key mask to the registered client 100 via the network 500 and registers the difference key mask with a key storage 350 will be described below.

The registered client 100 generates a difference key mask (S301).

The registered client 100 transmits the difference key mask to the management server 300 from a communication device 103 via the network 500 (S302).

The management server 300 receives the difference key mask transmitted via the network 500 by the registered client 100 from a communication device 303 (S303).

The management server 300 instructs a controller 310 to store the received difference key mask with the key storage 350 (S304).

The management server 300 transmits whether the difference key mask is registered or not to the registered client 100 from the communication device 303 via the network 500 (S305).

The registered client 100 receives whether the difference key mask is registered or not transmitted via the network 500 by the management server 300 from the communication device 103 (S306).

The registered client 100 displays registration information including whether the registration process is performed or not on the output device 102 for a user (S307).

The sequence showing the process in which the registered client 100 registers the difference key mask with the management server 300 via the network 500 has been described.

The procedure for the sequence is not necessarily required to comply with the above-mentioned order and may be also different order. Besides, the above-mentioned procedure is not necessarily required to be all processed.

Moreover, the search client 200 may also register the difference key mask with the management server 300 via the network 600.

<Confidential Data Search Flow>

A sequence showing a process in which the management server 300 searches the database 341 using confidential data transmitted via the network 600 by the search client 200 and further, the search client 200 acquires a search result will be described below.

The search client 200 stores information input from a user via an input device 201 in a storage 220 as a plaintext keyword 241 (S401).

The search client 200 instructs a controller 210 to generate a confidential keyword on the basis of the plaintext keyword 241 (S402).

The search client 200 transmits the confidential keyword to the management server 300 from a communication device 203 via the network 600 (S403).

The management server 300 receives the confidential keyword transmitted via the network 600 by the search client 200 from the communication device 303 (S404).

The management server 300 instructs the controller 310 to convert the confidential keyword (S405). A process for converting the confidential keyword will be described later.

The management server 300 instructs the controller 310 to search the database 341 for confidential data 343 related to the confidential keyword (S406).

The management server 300 converts the confidential data corresponding to the confidential keyword (S407). This conversion processing is processing for converting (updating) the confidential data corresponding to the update type secret key 170 of the registered client 100 to confidential data corresponding to the update type secret key 270 of the search client 200. For example, this conversion processing is realized by the re-encryption process described referring to FIG. 13 in the first embodiment.

The management server 300 transmits a search result (configured by both or either of confidential data and/or plaintext data) equivalent to the confidential keyword to the search client 200 from the communication device 303 via the network 600 (S408).

The search client 200 receives the search result transmitted via the network 600 by the management server 300 from the communication device 203 (S409).

When confidential data is included in the search result, the search client 200 instructs the controller 210 to decrypt plaintext data on the basis of the search result equivalent to the confidential keyword (S410).

The search client 200 stores the plaintext data in the storage 220 via an output device 202 (S409).

The search client 200 displays the plaintext data on the output device 202 (S411).

The sequence showing the process in which the management server 300 searches the database 341 using the confidential keyword transmitted via the network 600 by the search client 200 and further, the search client 200 acquires the search result has been described.

The procedure for the sequence is not necessarily required to comply with the above-mentioned order and may be also different order. Besides, the above-mentioned procedure is not necessarily required to be all processed.

In this sequence, the process for converting the confidential keyword and searching a converted confidential keyword and confidential data is described. This reason is that as the number of confidential keywords transmitted from the search client to the management server is fewer than the number of confidential data managed by the management server, the number of converted confidential keywords is fewer than the number of converted confidential data in searching and efficient processing can be expected. Naturally, the conversion to the confidential keyword is not required to be fixed, not a confidential keyword but confidential data is converted, and a process may be also changed so that a confidential keyword and converted confidential data are searched. Besides, a process may be also changed so that both confidential data and a confidential keyword are converted.

<Confidential Keyword Conversion Flow>

FIG. 16 shows a procedure for converting a confidential keyword in the management server 300. The whole processing unit 311 of the management server 300 secures a work area required for the process for converting the confidential keyword in the temporary memory 380.

The whole processing unit 311 of the management server 300 acquires an encrypted keyword body from the confidential keyword.

The whole processing unit 311 of the management server 300 acquires the corresponding block of the corresponding difference key mask according to description in a specified block 337. For example, when an AES key in a CBC mode having key length of 256 bits is specified for encryption algorithm 344 and an nth is specified for the specified block 337, the whole processing unit 311 divides a difference key mask into blocks every 128 bits and outputs Sn which is the nth data in the difference key mask S1, S2, - - - Sn as the corresponding block of the difference key mask.

The whole processing unit 311 of the management server 300 inputs the encrypted keyword body and the corresponding block of the difference key mask to the basic arithmetic unit 317, the basic arithmetic unit calculates their exclusive-OR (XOR), and the whole processing unit acquires an output result Wn' as a new encrypted keyword body.

In this case, a mathematical expression 13 holds true as a calculation formula.

$$Wn \text{ xor } Sn = Cn \text{ xor } Pn \text{ xor } Tn'$$ (Mathematical expression 13)

According to the mathematical expression 13, the encrypted keyword body calculated (Wi=Ci xor Pi xor Ti) by exclusive-OR (xor) of an intermediate encrypted keyword Cn, a random number stream Rn and a conventional type key stream Tn is transformed to a new encrypted keyword body calculated (Wi'=Ci xor Pi xor Ti') by exclusive-OR (xor) of an intermediate cryptograph Ci, a random number stream Ri and a new key stream Ti'. Accordingly, the conventional type key stream Ti is changed to the new key stream Ti'.

The whole processing unit 311 of the management server 300 makes data acquired by linking an initial vector, the encrypted keyword body and a search tag a new confidential keyword.

The whole processing unit 311 of the management server 300 releases the work area secured for converting the confidential keyword from the temporary memory 380.

The procedure for updating the confidential data 343 in the management server 300 is not necessarily required to comply with the above-mentioned order and may be also different order.

<Confidential Data Decryption Flow>

The management server 300 updates confidential data according to the similar procedure to the confidential data updation flow in the first embodiment. The search client 200 decrypts the confidential data according to the similar procedure to the confidential data decryption process in the first embodiment.

As described above, in a server/client model, a system that can also maintain a secure state for the server can be configured by converting encrypted data corresponding to the encrypted secret key to encrypted data corresponding to another secret key, maintaining a state in which the server can search encrypted data in an encrypted state. Besides, in the server/client type system that can search data in an encrypted state, as the data in the encrypted state on the server's side is not decrypted according to updation of a secret key on the client's side, re-encryption is efficiently enabled without applying a load onto the user's side.

REFERENCE SIGNS LIST

100: Registered client,
200: Search client,
300: Management server,
400: Network,
600: Computer,
101, 201, 301: Input device,
102, 202, 302: Output device,
103, 203, 303: Communication device,
110, 210, 310: Controller,
111, 211, 311: Whole processing unit,
112, 212: Encrypting unit,
213, 313: Decrypting unit,
114, 214: Pseudo-random number generating unit,
115, 215, 315: Irreversible conversion unit,
116, 216, 316: Homomorphic function unit,
117, 217, 317: Basic arithmetic unit,
118, 218: Key generating unit,
120, 220, 320: Storage,
130, 230, 330: Data storage, 140, 240, 340: Encryption context,
131, 342: Plaintext data,
135, 335: Search tag length,
136, 236, 336: Initial vector,
141, 244, 344: Encryption algorithm,
237, 337: Specified block,
241: Plaintext keyword,
341: Database,
343: Confidential data,
150, 250, 350: Key storage,
151, 251: Random number mask generation key,
152, 252: Data encryption key,
253: Data decryption key,
160, 260, 360: Fixed type secret key,
170, 270: Update type secret key,
171, 271: Key mask generation key,
172, 272: Nonce for key mask,
273, 354: Update type search key,
180, 280, 380: Temporary memory,
601: Central processing unit (CPU),
602: Memory,
603: External storage,
604: Communication device,
605: Output device,
606: Input device,
607: Reader-writer,
608: Storage medium,
609: Internal communication line.

The invention claimed is:

1. A searchable encryption processing system, comprising a registered client and a management server connected via a network,
wherein the registered client is provided with a registered client processing unit that generates a difference key mask, for updating confidential data that is encrypted by a first secret key, by a second secret key, based on a difference between the first secret key for encrypting plaintext data and the second secret key for newly encrypting the plaintext data,
wherein the registered client is provided with a key generating unit that generates the second secret key according to predetermined algorithm,
wherein the management server is provided with a server processing unit that updates the confidential data by the second secret key,
wherein the registered client processing unit sets the second secret key that updates the confidential data as a new first secret key,
wherein the management server instructs the server processing unit to update the confidential data by the second secret key acquired from difference between the confidential data and the difference key mask,
wherein the management server instructs the server processing unit to calculate a size of an encrypted data body included in the confidential data and to update the confidential data by a second secret key acquired based on a difference between a new difference key mask generated by the registered client and the confidential data, and
wherein the registered client instructs the registered client processing unit to generate a difference key mask equal to or exceeding at least the size as a new difference key mask.

2. The searchable encryption processing system according to claim 1, wherein:
the registered client is provided with a key generating unit that generates the first secret key on the basis of a first key mask generation key, a first nonce for a key mask and a pseudo-random number generating unit and generates the second secret key on the basis of a second key mask generation key, a second nonce for a key mask and the pseudo-random number generating unit; and
the registered client processing unit generates the difference key mask on the basis of the difference between the first secret key and the second secret key respectively generated by the key generating unit.

3. The searchable encryption processing system according to claim 1, comprising:
a search client connected to the management server via the network, wherein:
the search client is provided with a search client processing unit that generates a confidential keyword on the basis of a plaintext keyword and a first secret key for a search for encrypting the plaintext keyword; and
the management server instructs a server processing unit to search the confidential data in an encrypted state by determining whether data acquired on the basis of difference between a confidential keyword and the confidential data and the confidential data are coincident or not.

4. The searchable encryption processing system according to claim 3, wherein:
the search client instructs the search client processing unit to generate a difference key mask for a search for updating the confidential keyword encrypted by the first secret key for a search by a second secret key for a search on the basis of difference between the first secret key for a search and the second secret key for a search for newly encrypting the plaintext keyword.

5. The searchable encryption processing system according to claim 4, wherein:
the management server instructs the server processing unit to update the confidential keyword by the second secret key for a search acquired from difference between the confidential keyword and the difference key mask for a search.

6. The searchable encryption processing system according to claim 4, wherein:
the management server is connected to a plurality of search clients via a network; and
the server processing unit generates the difference key mask for a search every first secret key for a search corresponding to the search client.

7. The searchable encryption processing system according to claim 6, wherein:
the management server instructs the server processing unit to update the confidential keyword by the second secret key for a search acquired from difference between the generated confidential keyword and the difference key mask for a search every search client.

* * * * *